US010445485B2

United States Patent
Lee et al.

(10) Patent No.: US 10,445,485 B2
(45) Date of Patent: Oct. 15, 2019

(54) LOCK SCREEN OUTPUT CONTROLLING METHOD AND ELECTRONIC DEVICE FOR SUPPORTING THE SAME

(71) Applicant: Samsung Electronics Co., Ltd., Suwon-si, Gyeonggi-do (KR)

(72) Inventors: Chul Hwan Lee, Seoul (KR); Yong Joon Jeon, Hwaseong-si (KR); Geon Soo Kim, Suwon-si (KR); Doo Suk Kang, Suwon-si (KR); Sung Hyuk Shin, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 353 days.

(21) Appl. No.: 15/177,968

(22) Filed: Jun. 9, 2016

(65) Prior Publication Data

US 2016/0364564 A1 Dec. 15, 2016

(30) Foreign Application Priority Data

Jun. 11, 2015 (KR) .................. 10-2015-0082397

(51) Int. Cl.
*G06F 21/36* (2013.01)
*G06F 3/0488* (2013.01)
(Continued)

(52) U.S. Cl.
CPC ............ *G06F 21/36* (2013.01); *G06F 3/0482* (2013.01); *G06F 3/04842* (2013.01);
(Continued)

(58) Field of Classification Search
CPC .... G06F 21/36; G06F 3/0482; G06F 3/04845; G06F 3/04883; G06F 3/04886; G06F 3/04842
(Continued)

(56) References Cited

U.S. PATENT DOCUMENTS 7,593,000 B1 * 9/2009 Chin .................. G06F 3/04883
345/156
8,483,768 B2 * 7/2013 Kim ...................... G06F 3/041
455/566
(Continued)

FOREIGN PATENT DOCUMENTS

KR 10-2013-0097595 A 9/2013
KR 10-2014-0027828 A 3/2014
KR 10-2014-0044001 A 4/2014

OTHER PUBLICATIONS

Wikipedia, Outline of Object Recognition, Wikipedia, Jun. 4, 2016, (http://en.wikipedia.org/wiki/Outline_of_object_recognition).
(Continued)

*Primary Examiner* — Oleg Korsak
*Assistant Examiner* — Feliciano S Mejia
(74) *Attorney, Agent, or Firm* — Jefferson IP Law, LLP

(57) ABSTRACT

An apparatus and method for controlling lock-screen output are provided. The electronic device includes a touch screen display, a processor electrically connected to the display, and a memory electrically connected to the processor. The memory stores instructions that, when executed, cause the processor to display a first screen comprising sets of objects to the display, configure, in response to a first touch input for selecting an object displayed on the first screen, at least one object included in a set of objects related to the selected object as at least one lock object for releasing a lock screen, and display a second screen configured with the at least one lock object. In addition, various embodiments identified in the specification are enabled.

14 Claims, 27 Drawing Sheets

(51) Int. Cl.
*G06F 3/0482* (2013.01)
*G06F 3/0484* (2013.01)
(52) U.S. Cl.
CPC ...... *G06F 3/04845* (2013.01); *G06F 3/04883* (2013.01); *G06F 3/04886* (2013.01)
(58) Field of Classification Search
USPC .......................................................... 726/18
See application file for complete search history.

(56) References Cited

U.S. PATENT DOCUMENTS

| | | | | |
|---|---|---|---|---|
| 9,111,076 | B2* | 8/2015 | Park | G06F 3/0412 |
| 9,310,996 | B2* | 4/2016 | Lee | H04M 1/67 |
| 9,311,472 | B2* | 4/2016 | Nguyen | G06F 21/36 |
| 9,460,279 | B2* | 10/2016 | Birk | G06F 21/36 |
| 9,467,848 | B1* | 10/2016 | Song | G06F 3/0488 |
| 9,524,091 | B2* | 12/2016 | Oonishi | G06F 3/0488 |
| 9,563,296 | B2* | 2/2017 | Kitai | G06F 21/36 |
| 2013/0227450 | A1 | 8/2013 | Na et al. | |
| 2014/0055235 | A1 | 2/2014 | Choi | |

OTHER PUBLICATIONS

Won et al. A Touchscreen as a Biomolecule Detection Platform, Angewandte Chemie International Edition, Jan. 16, 2012, pp. 748-751, vol. 51, Wiley-VCH Verlag GmbH & Co. KGaA, Weinheim.
Kim et al., A Comparative Analysis of Heart Rate Variability of Electrocardiogram and Pulse-wave Using Time Series, Journal of Korean Society of Medical Informatics, Dec. 6, 2000, pp. 165-173, vol. 6, No. 4, Korea.
Guidelines: Heart Rate Variability—Standards of Measurement, Physiological Interpretation, and Clinical Use, European Heart Journal, Mar. 1996, pp. 354-381, vol. 17, American Heart Association Inc.; European Society of Cardiology.
Chang et al., Job Stress, Heart Rate Variability and Metabolic Syndrome, DBPia, Korean Journal of Occupational and Environmental Medicine 16(1), 2004, pp. 70-81, The Korean Society of Occupational and Environment, http://www.dbpia.co.kr/Article/NODE01156238.

* cited by examiner

LOCK SCREEN OUTPUT CONTROLLING METHOD AND ELECTRONIC DEVICE FOR SUPPORTING THE SAME

CROSS-REFERENCE TO RELATED APPLICATION(S)

This application claims the benefit under 35 U.S.C. § 119(a) of a Korean patent application filed on Jun. 11, 2015 in the Korean Intellectual Property Office and assigned Serial number 10-2015-0082397, the entire disclosure of which is hereby incorporated by reference.

TECHNICAL FIELD

The present disclosure relates to a method of controlling an output of a lock screen.

BACKGROUND

In general, an electronic device may output a lock screen for inducing a lock release input to allow only an authenticated user to use the electronic device, at a specified time point. The lock screen, for example, may include a password input screen, a pattern input screen, or a biometric information input screen. An electronic device may configure and output a lock release related lock object to a partial area of a lock screen according to the related art. As such, an electronic device may experience difficulties in displaying specific information by utilizing the entire area of a lock screen. For example, it is difficult for an electronic device to output a specific picture or a drawing such as a work of art, selected as the background image of a lock screen, to the entire screen.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of outputting a first screen including a designated image or a designated image and a designated display object as a lock screen and an electronic device for supporting the same.

In accordance with an aspect of the present disclosure, a method of outputting a second screen is provided. The method includes a lock object in correspondence to an input for selecting a designated point or object of the first screen or a biometric information input and an electronic device for supporting the same.

Accordingly, another aspect of the present disclosure is to provide a method of outputting a lock screen by differently configuring a lock object according to the type of an electronic device or the size of a display included in an electronic device and an electronic device for supporting the same.

In accordance with another aspect of the present disclosure, an electronic device is provided. The electronic device includes a touch screen display, a processor electrically connected to the display, and a memory electrically connected to the processor, wherein the memory stores instructions that when executed, cause the processor to display a first screen comprising sets of objects to the display, configure, in response to a first touch input for selecting an object displayed on the first screen, at least one object included in a set of objects related to the selected object as at least one lock object for releasing a lock screen, and display a second screen configured with the at least one lock object.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
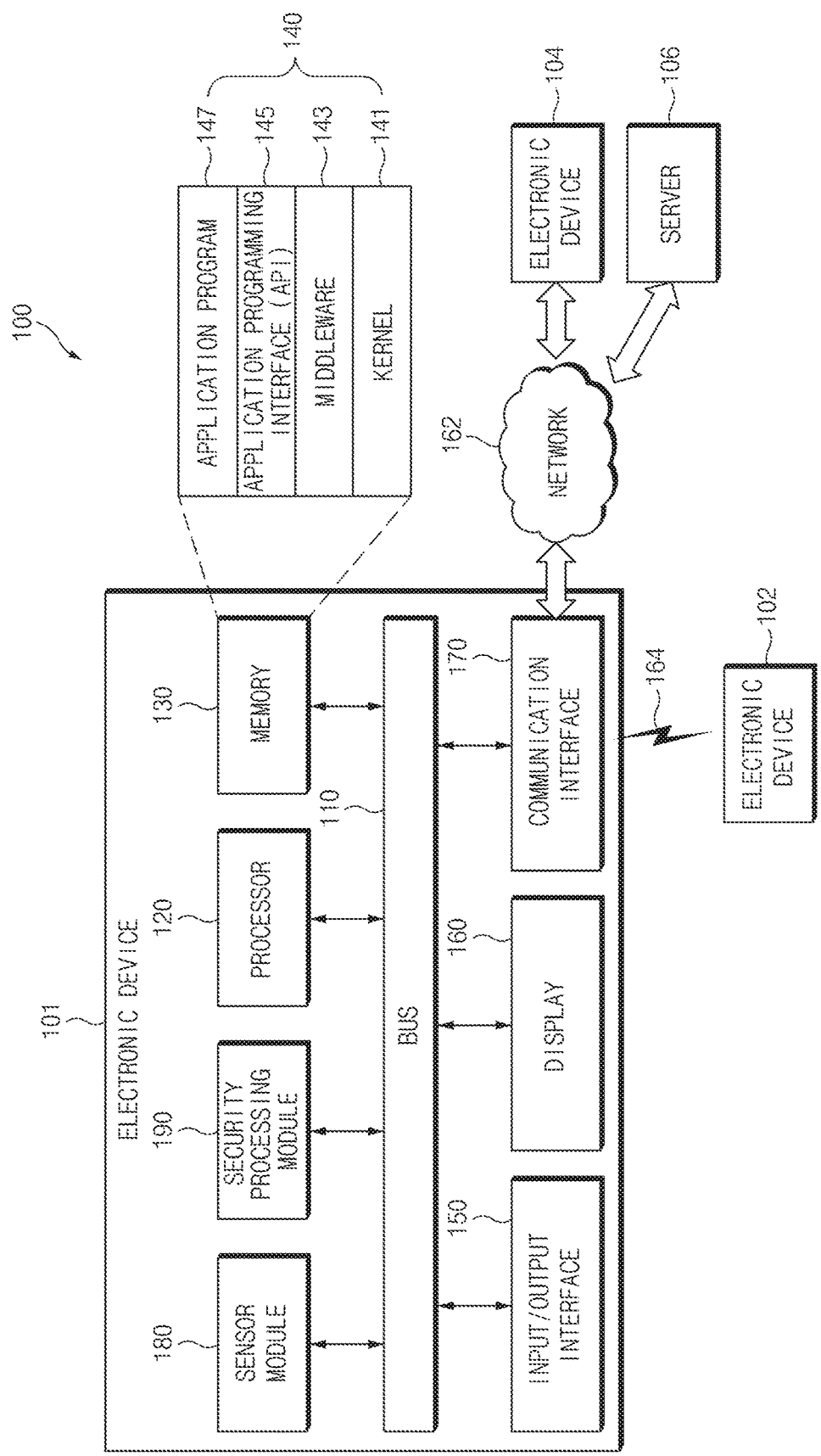
FIG. 1 is a block diagram of an electronic device relating to an output control of a lock screen according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For instance, the expression "A or B", or "at least one of A or/and B" may indicate include A, B, or both A and B. For instance, the expression "A or B", or "at least one of A or/and B" may indicate (1) at least one A, (2) at least one B, or (3) both at least one A and at least one B.

The terms such as "1st", "2nd", "first", "second", and the like used herein may refer to modifying various different elements of various embodiments of the present disclosure, but do not limit the elements. For instance, "a first user device" and "a second user device" may indicate different users regardless of the order or the importance. For example, a first component may be referred to as a second component and vice versa without departing from the scope of the present disclosure.

In various embodiments of the present disclosure, it will be understood that when a component (for example, a first component) is referred to as being "(operatively or communicatively) coupled with/to" or "connected to" another component (for example, a second component), the component may be directly connected to the other component or connected through another component (for example, a third component). In various embodiments of the present disclosure, it will be understood that when a component (for example, a first component) is referred to as being "directly connected to" or "directly access" another component (for example, a second component), another component (for example, a third component) does not exist between the component (for example, the first component) and the other component (for example, the second component).

The expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of". For example, "a processor configured (or set) to perform A, B, and C" in a phrase may mean a dedicated processor (for example, an embedded processor) for performing a corresponding operation or a generic-purpose processor (for example, a central processing unit (CPU) or application processor (AP)) for performing corresponding operations by executing at least one software program stored in a memory device.

Terms used in various embodiments of the present disclosure are used to describe specific embodiments of the present disclosure, and are not intended to limit the scope of other embodiments. The terms of a singular form may include plural forms unless they have a clearly different meaning in the context. Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning. In any cases, even the terms defined in this specification cannot be interpreted as excluding embodiments of the present disclosure.

According to various embodiments of the present disclosure, electronic devices may include at least one of smartphones, tablet personal computers (PCs), mobile phones, video phones, electronic book (e-book) readers, desktop personal computers (PCs), laptop personal computers (PCs), netbook computers, workstation server, personal digital assistants (PDAs), portable multimedia player (PMPs), Moving Picture Experts Group phase 1 or phase 2 (MPEG-1 or MPEG-2) audio layer 3 (MP3) players, mobile medical devices, cameras, and wearable devices. According to various embodiments of the present disclosure, the wearable devices may include at least one of accessory types (e.g., watches, rings, bracelets, anklets, necklaces, glasses, contact lenses, or head-mounted-devices (HMDs)), fabric or garment integrated types (for example, e-apparel), body-mounted types (for example, skin pads or tattoos), or bio-implantation types (for example, implantable circuits).

According to various embodiments of the present disclosure, an electronic device may be home appliance. The home appliance may include at least one of, for example, televisions, digital versatile disc (DVD) players, audios, refrigerators, air conditioners, cleaners, ovens, microwave ovens, washing machines, air cleaners, set-top boxes, home automation control panels, security control panels, television (TV) boxes (e.g., Samsung HomeSync™, Apple TV™ or Google TV™), game consoles (for example, Xbox™ and PlayStation™), electronic dictionaries, electronic keys, camcorders, and electronic picture frames.

According to various embodiments of the present disclosure, an electronic device may include at least one of various medical devices supporting call forwarding service (for example, various portable measurement devices (for example, glucometers, heart rate meters, blood pressure meters, temperature meters, etc.), magnetic resonance angiography (MRA) devices, magnetic resonance imaging (MRI) devices, computed tomography (CT) devices, medical imaging devices, ultrasonic devices, etc.), navigation devices, global navigation satellite system (GNSS), event data recorders (EDRs), flight data recorders (FDRs), vehicle infotainment devices, marine electronic equipment (for example, marine navigation systems, gyro compasses, etc.), avionics, security equipment, vehicle head units, industrial or household robots, financial institutions' automatic teller's machines (ATMs), or stores' point of sales (POS) or internet of things (for example, bulbs, various sensors, electric or gas meters, sprinkler systems, fire alarms, thermostats, street lights, toasters, exercise equipment, hot water tanks, heaters, boilers, etc.).

In various embodiments of the present disclosure, an electronic device may include at least one of part of furniture or buildings/structures supporting call forwarding service, electronic boards, electronic signature receiving devices, projectors, and various measuring instruments (for example, water, electricity, gas, or radio signal measuring instruments). An electronic device according to various embodiments of the present disclosure may be one of the above-mentioned various devices or a combination thereof. Additionally, an electronic device according to an embodiment of the present disclosure may be a flexible electronic device. Additionally, an electronic device according to an embodiment of the present disclosure is not limited to the above-mentioned devices and may include a new kind of an electronic device according to the technology development.

Hereinafter, an electronic device according to various embodiments of the present disclosure will be described in more detail with reference to the accompanying drawings. The term "user" in this disclosure may refer to a person using an electronic device or a device using an electronic device (for example, an artificial intelligent electronic device).

FIG. 1 is a block diagram of an electronic device relating to an output control of a lock screen according to various embodiments of the present disclosure.

Referring to FIG. 1, an electronic device 101 in a network environment 100 is described according to various embodiments of the present disclosure. The electronic device 101 may include a bus 110, a processor 120, a memory 130, an input/output interface 150, a display 160, a communication interface 170, a sensor module 180, and a security processing module 190. According to an embodiment of the present disclosure, the electronic device 101 may omit at least one of the components or may additionally include a different component.

The bus 110, for example, may include a circuit for connecting the components 110 to 170 to each other and delivering a communication (for example, control message and/or data) between the components 110 to 170.

The processor 120 may include at least one of a central processing unit (CPU), an Application Processor (AP), and a communication processor (CP). The processor 120, for example, may execute calculation or data processing for control and/or communication of at least one another component of the electronic device 101. According to various embodiments of the present disclosure, the processor 120 may include at least part of components of the security processing module 190 or may perform at least part of functions of the security processing module 190.

The memory 130 may include volatile and/or nonvolatile memory. The memory 130, for example, may store instructions or data relating to at least one another component of the electronic device 101. According to an embodiment of the present disclosure, the memory 130 may store software and/or program 140. The program 140 may include a kernel 141, a middleware 143, an application programming interface (API) 145, and/or an application program (or an application) 147. At least part of the kernel 141, the middleware 143, and the API 145 may be called an operating system (OS).

The kernel 141, for example, may control or manage system resources (for example, the bus 110, the processor 120, the memory 130, and so on) used for performing operations or functions implemented in other programs (for example, the middleware 143, the API 145, or the application program 147). Additionally, the kernel 141 may provide an interface for controlling or managing system resources by accessing an individual component of the electronic device 101 from the middleware 143, the API 145, or the application program 147.

The middleware 143, for example, may serve as an intermediary role for exchanging data as the API 145 or the application program 147 communicates with the kernel 141.

Additionally, the middleware 143 may process at least one job request received from the application program 147 according to a priority. For example, the middleware 143 may assign to at least one application program 147 a priority for using a system resource (for example, the bus 110, the processor 120, or the memory 130) of the electronic device 101. For example, the middleware 143 may perform scheduling or load balancing on the at least one job request by processing the at least one job request according to the priority assigned to the at least one job request.

The API 145, as an interface for allowing the application 147 to control a function provided from the kernel 141 or the middleware 143, may include at least one interface or function (for example, an instruction) for file control, window control, image processing, or character control.

According to various embodiments of the present disclosure, the memory 130 may include security processing related information, resources, and instructions. For example, the memory 130 may include an instruction for processing a security processing related user input, an instruction for analyzing an image and generating a lock screen based the analyzed information, and an instruction for displaying the generated lock screen. Additionally, the memory 130 may store an image related to the performances of the instructions.

The input/output interface 150, for example, may serve as an interface for delivering instructions or data inputted from a user or another external device to another component(s) of the electronic device 101. Additionally, the input/output interface 150 may output instructions or data received from another component(s) of the electronic device 101 to a user or another external device.

The display 160, for example, may include a liquid crystal display (LCD), a light emitting diode (LED) display, an organic light emitting diode (OLED) display, a microelectromechanical systems (MEMS) display, or an electronic paper display. The display 160, for example, may display a variety of contents (for example, text, image, video, icon, symbol, and so on) to a user. The display 160 may include a touch screen, and for example, may receive a touch, gesture, proximity, or hovering input by using an electronic pen or a user's body part.

The communication interface 170, for example, may set a communication between the electronic device 101 and an external device (for example, the first external electronic device 102, the second external electronic device 104, or the server 106). For example, the communication interface 170 may communicate with an external device (for example, the second external electronic device 104 or the server 106) in connection to the network 162 through wireless communication or wired communication.

The wireless communication, as a cellular communication protocol, may use at least one of long-term evolution (LTE), LTE Advance (LTE-A), code division multiple access (CDMA), wideband CDMA (WCDMA), universal mobile telecommunications system (UMTS), wireless broadband (WiBro), global system for mobile communications (GSM), and so on. Additionally, the wireless communication, for example, may include a short range communication 164. The short range communication 164, for example, may include at least one of wireless fidelity (Wi-Fi), Bluetooth (BT), near field communication (NFC), global positioning system (GPS), and so on. The GNSS may include at least one of GPS, Glonass, and Beidou Navigation Satellite System (hereinafter referred to as Beidou) and Galileo, that is, the European global satellite-based navigation system. Hereinafter, GPS and GNSS may be interchangeably used. The wired communication, for example, may include at least one of universal serial bus (USB), high definition multimedia interface (HDMI), recommended standard 232 (RS-232), plain old telephone service (POTS), and so on. The network 162 may include telecommunications network, for example, at least one of computer network (for example, local area network (LAN) or wide area network (WAN)), internet, and telephone network.

Each of the first and second external electronic devices 102 and 104 may be the same or different type of the electronic device 101. According to an embodiment of the present disclosure, the server 106 may include a group of one or more servers. According to various embodiments of the present disclosure, all or part of operations executed on the electronic device 101 may be executed on another one or more electronic devices (for example, the electronic device 102 or 104 or the server 106).

According to an embodiment of the present disclosure, when the electronic device 101 performs a certain function or service automatically or by a request, it may request at least part of a function relating thereto from another device (for example, the electronic device 102 or 104 or the server 106) instead of or in addition to executing the function or service by itself. The other electronic device (for example, the external electronic device 102 or 104 or the server 106) may execute a requested function or an additional function and may deliver an execution result to the electronic device 101. The electronic device 101 may provide the requested function or service as it is or by processing the received result additionally. For this, for example, cloud computing, distributed computing, or client-server computing technology may be used.

The sensor module 180 may sense an approach or contact of a target object, for example, a user's body part, or detect an operating state of the electronic device 101. For example, the sensor module 180 may include a biometric sensor such as a fingerprint sensor, an iris sensor, or a muscle sensor. Additionally, the sensor module 180 may include a gesture sensor, a gyro sensor, a proximity sensor, a grip sensor, or a touch sensor.

The security processing module 190 may process a security processing related user input. For example, the security processing module 190 may process a touch input or a gesture input, which is inputted in a state that a lock screen is outputted. Additionally, the security processing module 190 may generate a lock screen by analyzing an image set as a theme or a background image. According to an embodiment of the present disclosure, the security processing module 190 may extract a designated object from the image including at least one object, and generate or configure a lock object based on the extracted object.

According to various embodiments of the present disclosure, the security processing module 190 may output the generated lock screen to the display 160. According to an embodiment of the present disclosure, the security processing module 190 may output a first screen of a lock screen including the image set as a background image or the image and a designated display object, at a designated time point, for example, a time point that the display 160 changes from a turn-off state to a turn-on state. Additionally, when an input for selecting a designated object from a designated area of the first screen or the image including at least one object occurs in a state that the first screen is outputted, the security processing module 190 may output a second screen including a lock object. According to various embodiments of the present disclosure, when authenticated biometric information is inputted regardless of an output state of the first screen, the security processing module 190 may omit or terminate the output of a lock screen, and perform a control to output a designated screen (for example, a home screen).

Figure 2:
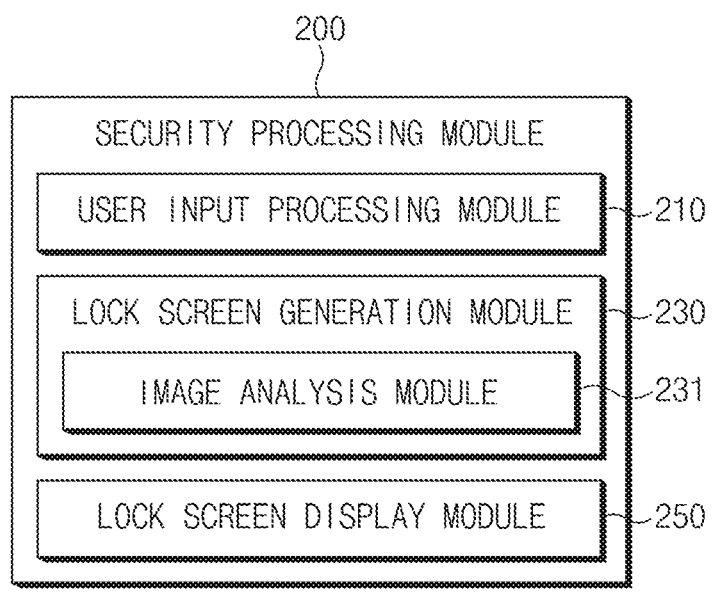
FIG. 2 is a view illustrating a security processing module according to various embodiments of the present disclosure.

FIG. 2 is a view illustrating a security processing module 200 according to various embodiments of the present disclosure. The security processing module 200 may have the same or similar configuration to the security processing module 190 of FIG. 1.

Referring to FIG. 2, the security processing module 200 may include a user input processing module 210, a lock screen generation module 230, and a lock screen display module 250. The user input processing module 210 may process an inputted touch input or gesture input in a state that a lock screen is outputted. According to an embodiment of the present disclosure, the user input processing module 210 may analyze a user input occurring in a state that a first screen of a lock screen is outputted. For example, the user input processing module 210 may recognize the type, occurrence position, or occurrence time of the user input, and determine whether a designated area of the first screen is selected or whether a designated object included in the background image of the first screen is selected. According to various embodiments of the present disclosure, the user input processing module 210 may analyze a user input occurring in a state that a second screen of a lock screen is outputted. For example, the user input processing module 210 may process a password (or pin code) input or a pattern input.

The lock screen generation module 230 may generate the first screen of the lock screen by configuring a theme image or a selected image as a background image. According to various embodiments of the present disclosure, the lock screen generation module 230 may configure a designated display object, for example, a function icon (for example, a phone icon or a camera icon), a user designation widget, or a system notification object, on the first screen.

According to various embodiments of the present disclosure, the lock screen generation module 230 may extract at least one object from the background image by analyzing the background image. According to an embodiment of the present disclosure, the lock screen generation module 230 may include an image analysis module 231. The image analysis module 231 may distinguish objects that configure a target image by analyzing the target image. According to an embodiment of the present disclosure, the image analysis module 231 may distinguish objects by determining the property of an object for each object. For example, the image analysis module 231 may determine whether a corresponding object is a person, an animal, or an object, and furthermore, may distinguish objects by determining a person's body part (for example, a face), an animal's type, or an object's type. According to various embodiments of the present disclosure, the image analysis module 231 may analyze a position (for example, coordinates information) on a screen where each object is disposed.

According to various embodiments of the present disclosure, the image analysis module 231 may perform a pre-processing function for changing an image to be recognized easily in advance in order for object recognition, a recognition function for recognizing an object, and a post-processing function for increasing a recognition accuracy of data processed by the recognition function. The pre-processing function, for example, may include methods such as noise removal, segmentation, size normalization, edge detection, color constancy algorithm, region growing, or boundary trace. The recognition function, for example, may include methods such as pattern matching, template matching, artificial intelligence, neural network, fuzzy algorithm, decision tree, genetic algorithm, principal component analysis (PCA), scale invariant feature transform (SIFT), speeded up robust features (SURF), or deep learning. When a recognition result accuracy is less than a predetermined level based on data processed by the recognition function, the post-processing function, for example, may include a method of suggesting a candidate to a user and receiving a selection input, and a method of reducing a candidate group based on another algorithm or context.

An image dividing method in the above-mentioned image analyzing method may include a method such as region growing, split-and-merge, or graph partitioning. The region growing and split-and-merge methods, as a method of dividing an image into small areas and combining similar areas by calculating a color or brightness difference between adjacent areas, may divide an image by using the final remaining areas. However, there is a difference in that the former is a bottom-up method that starts from a small area and performs combination and the latter is a top-down method that divides a large area into small areas and searches for an area. The above-mentioned two methods may obtain a division result within a relatively short time. Compared to this, the graph partitioning method is a method of designating each pixel of an image as a node and using a graph connected with an edge having a pixel difference value between adjacent pixels as a weight. The graph partitioning method may divide an image to allow an energy function that pre-defines such a graph to be minimized. In this case, the graph partitioning method may be divided into several methods according to the type of an energy function used. The graph partitioning method may be required to designate an area that should be or should not be included in an object and a computation amount may be slightly more according to the type of an energy function and the size of an image. However, the graph partitioning method may have a relative good division result and may easily correspond to various forms of user inputs. Besides that, various methods for recognizing an object may be used.

According to various embodiments of the present disclosure, the lock screen generation module 230 may generate a second screen of a lock screen through a method of generating a lock object based on at least one extracted object or designating the extracted object as a lock object.

According to an embodiment of the present disclosure, when the extracted object is selected, the lock screen generation module 230 may generate the second screen by configuring a lock group including the extracted object, for example, a set of objects having a similar or same size, shape, or color as the extracted object as lock objects. In this case, the lock screen generation module 230 may not include objects having the same characteristics as the extracted object among objects not included in the lock group or may remove them from the first screen. According to various embodiments of the present disclosure, when the extracted object is selected, the lock screen generation module 230 may generate a lock object with an image relating to the extracted object and configure it as the second screen.

The lock screen display module 250 may perform a function for outputting the lock screen to the display 160. According to an embodiment of the present disclosure, when the display 160 switches from a turn-off state into a turn-on state, the lock screen display module 250 may display a first screen of a lock screen.

According to various embodiments of the present disclosure, when a designated area of the first screen is selected or a designated object is selected from an image (for example, a background image) including at least one object that configures the first screen is selected in a state that the first screen is outputted, the lock screen display module 250 may display the second screen of the lock screen. In this case, the lock screen display module 250 may overlay the second screen on the first screen transparently or opaquely. Alternatively, the lock screen display module 250 may display the second screen in a partial area of the first screen. Alternatively, according to another embodiment of the present disclosure, the lock screen display module 250 may change (for example, blur process) the form of an image that configures the first screen and display the second screen. According to an embodiment of the present disclosure, the lock screen display module 250 may process only lock objects transparently or opaquely and arrange them in a partial area of the first screen.

Figure 3:
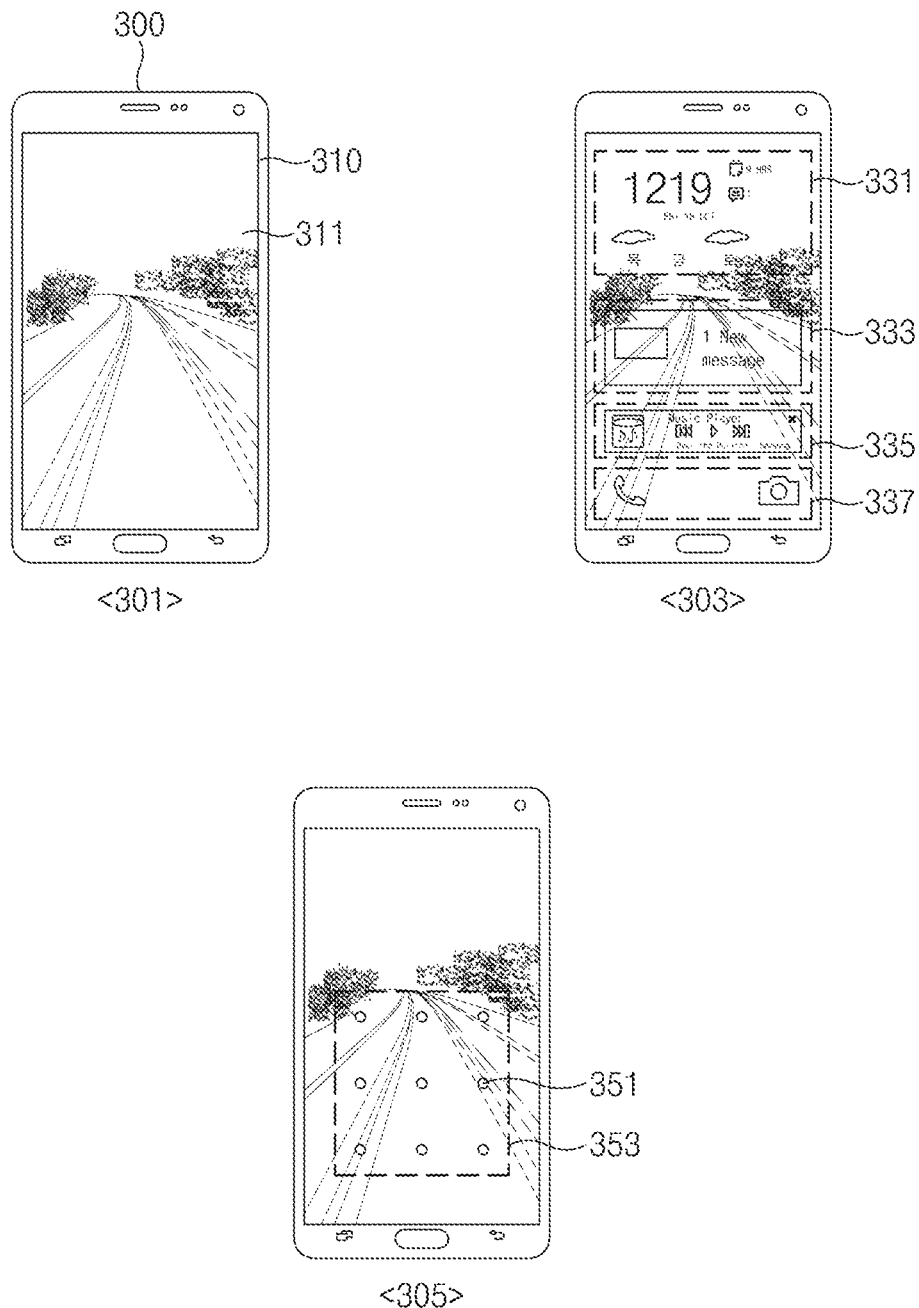
FIG. 3 is a view illustrating a configuration of a lock screen according to various embodiments of the present disclosure.

FIG. 3 is a view illustrating a configuration of a lock screen according to various embodiments of the present disclosure.

Referring to FIG. 3, the electronic device 300 may output a lock screen 310 at a designated time, for example, a time point that the display 160 switches from a turn-off state into a turn-on state. In this case, as shown in a state 301, the lock screen 310 may output a background image 311 configured with a theme image or a user custom image to a first screen.

According to an embodiment of the present disclosure, as shown in a state 303, the lock screen 310 may configure and output the first screen with a display object designated together with the background image 311, for example, a user custom widget (for example, a watch widget 331 or a music playback widget 335), a system notification object (for example, a message reception notification object 333) or a function icon (for example, a call icon and a camera icon 337).

When a designated user input (for example, a touch input or a gesture input) occurs in a state that the first screen is outputted, the electronic device 300, as shown in a state 305, may output a second screen configured with at least one lock object 351. The lock object 351 may be a password input object or a pattern input object. According to various embodiments of the present disclosure, based on a designated color (for example, the most frequently used color or a color at a point where the user input occurs) among at least one color used for the background image 311, in relation to the lock object 351, a color or a background color may be designated with a color similar or identical to the color.

According to various embodiments of the present disclosure, the electronic device 300 may specify the position of the lock object 351 differently according to the position (for example, a user's grip position) of a user input. According to an embodiment of the present disclosure, the electronic device 300 may map a function (or application) to each lock object 351 and display it.

According to various embodiments of the present disclosure, the electronic device 300 may overlay the second screen on the first screen transparently or opaquely or as shown in the state 305, may process the second screen in a partial area 353 of the first screen transparently or opaquely and output it. Alternatively, the electronic device 300 may change-process (for example, blur-process) the background image 311 and output the second screen. According to an embodiment of the present disclosure, the electronic device 300 may dispose only the lock object 351 in the partial area 353 of the first screen.

Figure 4:
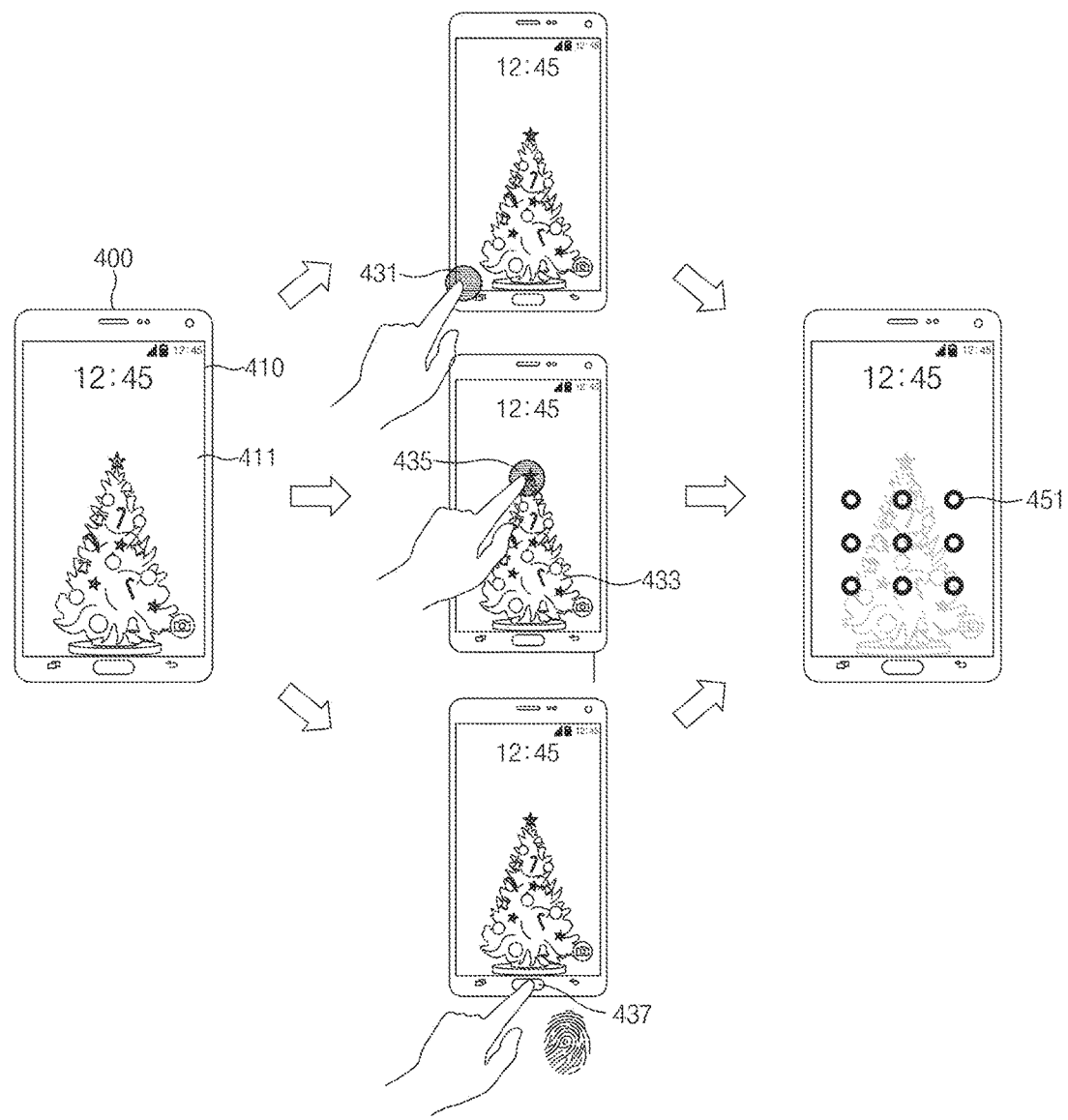
FIG. 4 is a view illustrating an output control of a lock screen according to various embodiments of the present disclosure.

FIG. 4 is a view illustrating an output control of a lock screen according to various embodiments of the present disclosure.

Referring to FIG. 4, the electronic device 400 may output a lock screen 410 where a background image 411 is configured with a first screen. According to various embodiments of the present disclosure, when a designated user input occurs or biometric information of an authenticated user is inputted in a state that the first screen is outputted, the electronic device 100 may output a second screen. For example, when an input for selecting a designated area 431 (for example, at least one area in the edge area of a screen) of the first screen in a state that the first screen is outputted or an input for selecting a designated object 433 from the background image 411 including at least one object configuring the first screen occurs, or user's biometric information authenticated based on a sensor (for example, the fingerprint recognition sensor 437) is collected, the electronic device 400 may output the second screen configured with at least one lock object 451.

According to various embodiments of the present disclosure, the electronic device 400 may output the second screen by differently configuring the position, size, or type of the lock object 451 according to the position of the designated area 431. Alternatively, the electronic device 400 may differently configure the lock object 451 according to the type of the designated object 433 or a selection point 435 of the designated object 433.

According to an embodiment of the present disclosure, the electronic device 400 may identify a user based on the collected biometric information and may differently configure the lock object 451 according to a user. According to various embodiments of the present disclosure, the electronic device 400 may differently specify a security level according to the type, size or position of the lock object 451.

Figure 5:
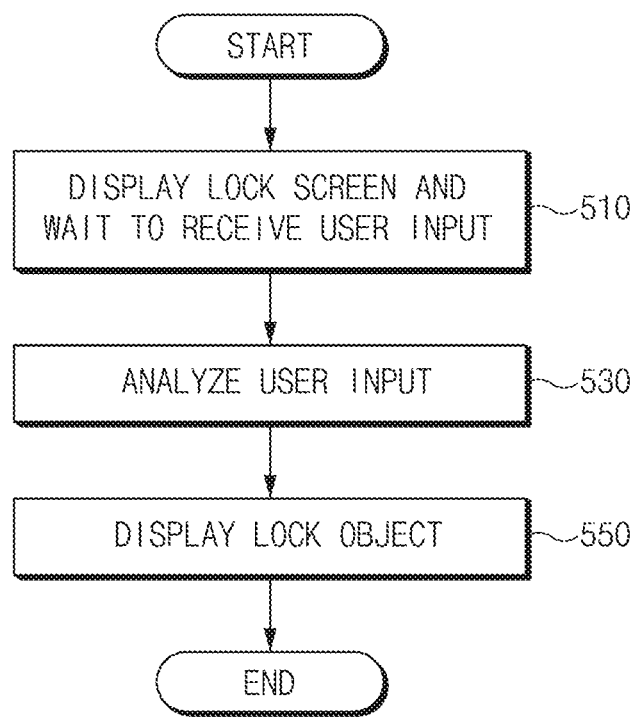
FIG. 5 is a flowchart illustrating an operating method of an electronic device relating to an output control of a lock screen according to various embodiments of the present disclosure.

FIG. 5 is a flowchart illustrating an operating method of an electronic device relating to an output control of a lock screen according to various embodiments of the present disclosure.

Referring to FIGS. 1 and 5, the electronic device 101, in operation 510, may display a lock screen at a designated time point, for example, a time point that the display 160 switches from a turn-off state into a turn-on state or a time point that a designated application is selected. In this case, the electronic device 101 may output a first screen configured with a background image or a background image and a designated display object. Additionally, the electronic device 101 may wait to receive a security processing related user input.

When a user input occurs, in operation 530, the electronic device 101 may analyze the user input. For example, the electronic device 101 may recognize the type, occurrence position, or occurrence time of the user input. According to various embodiments of the present disclosure, based on the analyzed information, the electronic device 101 may determine whether the user input selects a designated area of the first screen or selects a designated object from a background mage including at least one object of the first screen. The electronic device 101 may generate a second screen by differently configuring at least one lock object according to the position, type or selection point of the designated object. According to an embodiment of the present disclosure, the electronic device 101 may collect user's biometric information based on the sensor module 180 and analyze the biometric information, thereby differently configuring at least one lock object according to a user.

In operation 550, the electronic device 101 may display a lock object. For example, the electronic device 101 may output the second screen configured with at least one lock object to the display 160. According to an embodiment of the present disclosure, the electronic device 101 may overlay the second screen on the first screen or output the second screen to a partial area of the first screen. According to another embodiment of the present disclosure, the electronic device 101 may perform a deformation process on a background image configuring the first screen and output the second screen. According to an embodiment of the present disclosure, the electronic device 101 may dispose at least one lock object on the first screen and output it.

Figure 6:
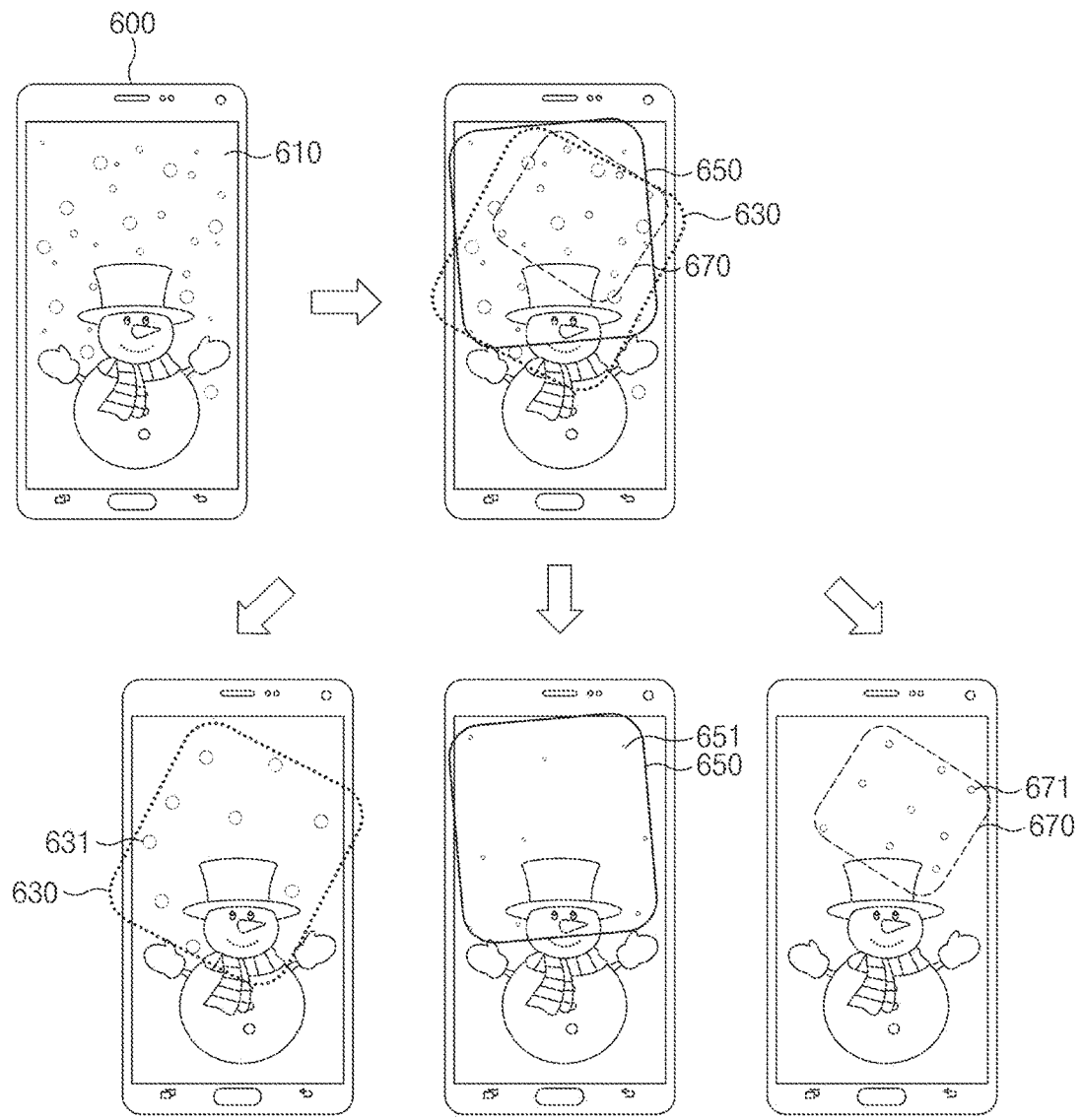
FIG. 6 is a view illustrating an output of a lock screen depending on a selected lock group according to various embodiments of the present disclosure.

FIG. 6 is a view illustrating an output of a lock screen depending on a selected lock group according to various embodiments of the present disclosure.

Referring to FIG. 6, the electronic device 600 may output a background image 610 as a first screen of a lock screen. According to various embodiments of the present disclosure, an electronic device 600 may generate a second screen of a lock screen by analyzing the background image 610. In relation to the generation of the second screen, the electronic device 600 may analyze a background image. For example, the electronic device 600 may extract at least one object configuring a background image. In the drawing shown, the electronic device 600 may extract snowflakes, a snowman, a hat, a pair of gloves, or a shawl included in the background image.

According to various embodiments of the present disclosure, the electronic device 600 may generate or specify a lock object based on a designated object among the extracted objects. In relation to this, the electronic device 600 may specify the designated object among the extracted objects at one of a time point for selecting whether to use a lock screen, a background image selection time point of a lock screen, a theme setting time point, or a time point that a user input occurs in a first screen output state of a lock screen. For example, the electronic device 600 may specify as the designated object a representative object (for example, an object occupying more than a designated area of an image, an object disposed close to the center point of an image, or an object selected based on property information (for example, a theme, a background, or an artist) of an image) of an extraction target image according to an image analysis routine, or provide an interface for selecting the designated object, thereby inducing a user to make a choice.

According to various embodiments of the present disclosure, the electronic device 600 may configure at least one lock group by using at least one different object included in the background image 610. For example, the electronic device 600 may bind objects having the same or similar size, shape, or color among objects included in the background image 610 and configure them as one lock group. According to various embodiments of the present disclosure, the electronic device 600 may configure a lock group based on information designated by a system or history information on a lock group that a user specifies before. In the drawing shown, the electronic device 600 binds snowflakes having the same or similar size to display a screen where a first lock group 630, a second lock group 650, and a third lock group 670 are configured.

According to various embodiments of the present disclosure, the electronic device 600 may generate a second screen of a lock screen by using a lock group including an object selected in correspondence to a user's selection input to output it to the display 160 (illustrated in FIG. 1). For example, the electronic device 600 may specify each of at least one object included in a corresponding lock group as a lock object.

According to various embodiments of the present disclosure, if there is an object not displayed among objects included in a corresponding lock group, the electronic device 600 may generate a lock object corresponding to a corresponding object to be similar or identical to another lock object.

According to an embodiment of the present disclosure, the electronic device 600 may remove objects included in another lock group other than a lock group selected from the first screen. For example, in correspondence to the selection of the first object 631, the electronic device 600 may remove objects included in the second lock group 650 and the third lock group 670 other than the first lock group 630 from the first screen, and generate and output the second screen based on the objects included in the first lock group 630. When the second object 651 and the third object 671 are selected, through the same manner, the second screen may be generated and outputted based on a lock group including a corresponding object.

According to various embodiments of the present disclosure, when a plurality of objects is selected, the electronic device 600 may generate a second screen of a lock screen by using at least one lock group including the selected objects and output the second screen to the display 160. For example, the electronic device 600 may select at least one object from each of lock groups including selected objects to specify it as each lock object. According to various embodiments of the present disclosure, if the number of lock objects required is not satisfied by objects included in the lock groups, the electronic device 600 may generate a required number of lock objects to be similar or identical to the selected objects. According to various embodiments of the present disclosure, when a plurality of objects is selected, the electronic device 600 may remove objects included in an unselected lock group from the first screen.

Figure 7:
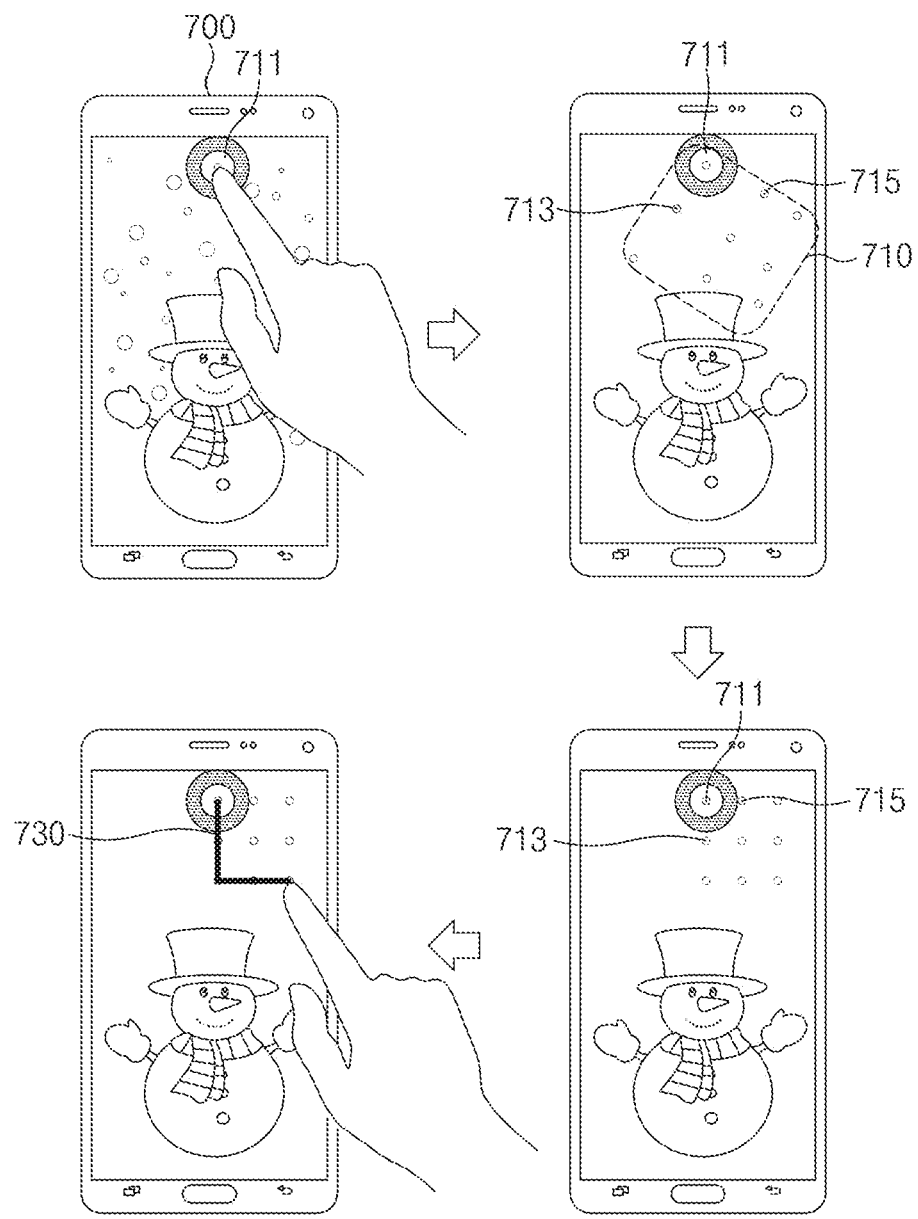
FIG. 7 is a view illustrating an alignment and display of a selected lock group according to various embodiments of the present disclosure.

FIG. 7 is a view illustrating an alignment and display of a selected lock group according to various embodiments of the present disclosure.

Referring to FIG. 7, when a designated object 711 is selected from a background image including at least one object, the electronic device 700 may generate and output a second screen of a lock screen based on a lock group 710 including the selected object 711. In this case, the electronic device 700 may align and display lock objects based on the physical position (for example, coordinates information) of the selected object 711. For example, the electronic device 700 may specify the selected object 711 as a start position (for example, the position of a first pattern input object) of a pattern input, and dispose pattern input objects at a designated interval based on a position relationship with other objects.

According to an embodiment of the present disclosure, the electronic device 700 may measure a distance between each other by using coordinates information between the selected object 711 and other objects. Based on the distance information, the electronic device 700 may dispose objects to allow a predetermined interval to be maintained in the spaced distance order.

In relation to this, when disposing objects at regular intervals, the electronic device 700 may arrange them to have a designated number of rows and columns according to the characteristics of a pattern input screen. This may represent a relative position in a pattern input. For example, when a pattern input screen is configured to have three rows and three columns, a first pattern input object may be disposed at the left uppermost end of the pattern input screen, a second pattern input object may be disposed at the right of the first pattern input object, and a third pattern input object may be disposed at the right of the second pattern input object. Additionally, fourth, fifth, and sixth pattern input objects may be respectively disposed at the lower ends of the first, second, and third pattern input objects. In the same manner, the remaining seventh, eighth, and ninth pattern input objects are respectively disposed at the lower ends of the fourth, fifth, and sixth pattern input objects and as a result, the ninth pattern input object may be located at the right lowermost end of the pattern input screen.

According to various embodiments of the present disclosure, when a difference value with respect to an x-axis coordinate value of a corresponding object is less than a value of a designated range, the electronic device 700 may dispose pattern input objects at the left; when the difference value is greater than the value, dispose them at the right; and when the difference value is included in the range, dispose them on the same x-axis.

According to various embodiments of the present disclosure, when a difference value with respect to a y-axis coordinate value of a corresponding object is less than a value of a designated range, the electronic device 700 may dispose pattern input objects at the upper end; when the difference value is greater than the value, dispose them at the lower end; and when the difference value is included in the range, dispose them on the same y-axis. As shown in the drawing, based on the selected object 711, the electronic device 700 may dispose a second object 715 having an x-axis value greater than a designated range and a y-axis value within a value of a designated range to have a designated interval only at the right of the selected object 711.

According to various embodiments of the present disclosure, based on the selected object 711, the electronic device 700 may dispose a third object 713 having an x-axis value within a value of a designated range and a y-axis value greater than a value of a designated range to have a designated interval only at the lower end of the selected object 711. In this case, according to the characteristics of a pattern input screen, the second object 715 may be designated as a second pattern input object, and the third object 713 may be designated as a fourth pattern input object.

According to various embodiments of the present disclosure, the electronic device 700 may align and display lock objects based on a relative position in a pattern input with respect to the selected object 711. For example, when the selected object 711 is designated as a second pattern input object, a lock object designated as a first pattern input object may be disposed at the left of the selected object 711 and a lock object designated as a third pattern input object may be disposed at the right of the selected object 711.

According to an embodiment of the present disclosure, the electronic device 700 may specify the selected object 711 as a first lock object of a password or pattern that a user sets, and align other lock objects included in the lock group 710 to be disposed at the next position of the selected object 711 and display them. In this case, the selection of the selected object 711, the alignment and display of lock objects included in the lock group 710, and the input of the designated pattern 730 set as a lock release input may function in correspondence to a one touch input.

According to various embodiments of the present disclosure, the electronic device 700 may output lock objects at positions, which are displayed when the designated object 711 is selected, as they are, without rearranging the lock objects, and may dispose the lock objects at designated positions according to a designated order of the lock objects and output them. The alignment and display method of the lock objects may be implemented variously through function execution according to lock screen setting information or automatic function execution according to a lock object alignment and display routine. According to various embodiments of the present disclosure, the electronic device 700 may differently specify a security level according to whether to perform rearrangement or a rearrangement rule.

Figure 8:
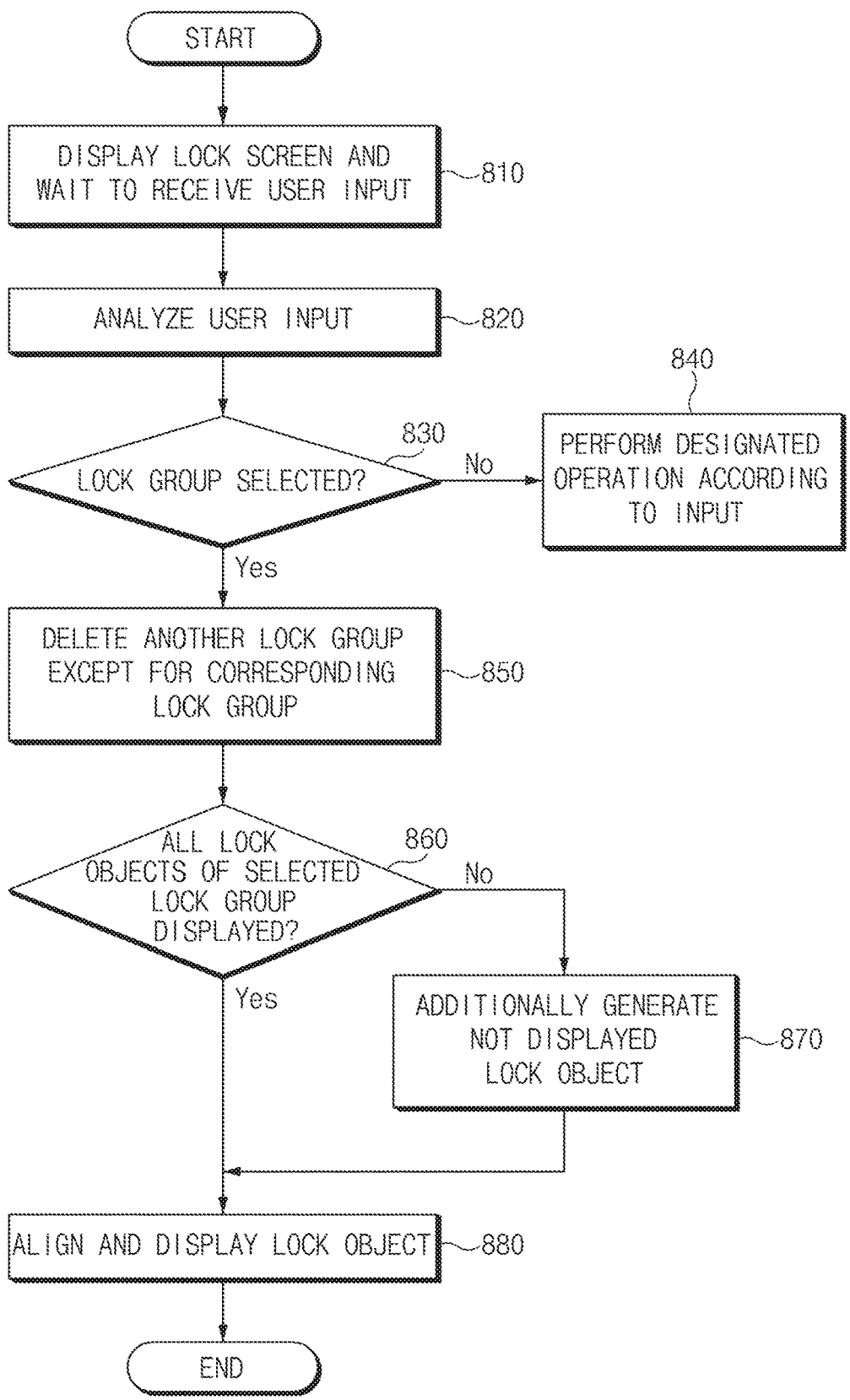
FIG. 8 is a flowchart illustrating an operating method of an electronic device relating to an output of a lock screen depending on a selected lock group according to various embodiments of the present disclosure.

FIG. 8 is a view illustrating an operating method of an electronic device relating to an output of a lock screen depending on a selected lock group according to various embodiments of the present disclosure.

Referring to FIG. 8, in operation 810, the electronic device 101 (illustrated in FIG. 1) may display a first screen of a lock screen configured as a background image, and wait to receive a user input. According to various embodiments of the present disclosure, the electronic device 101 may wait to receive a security processing related user input. When a user input occurs, in operation 820, the electronic device 101 may analyze the user input. For example, the electronic device 101 may recognize the type, occurrence position, or occurrence time of the user input. According to various embodiments of the present disclosure, based on the analyzed information, the electronic device 101 may analyze whether a designated object is selected from a background image including at least one object of the first screen by a user input.

In operation 830, the electronic device 101 may determine whether a user input is an input for selecting a lock group. If the user input is not an input for selecting a lock group, as in operation 840, the electronic device 101 may perform a designated operation according to the user input. If the user input is an input for selecting a lock group, as in operation 850, the electronic device 101 may delete other lock groups except for the selected lock group. For example, the electronic device 101 may remove objects included in other lock groups except for the selected lock group from the first screen.

In operation 860, the electronic device 101 may determine whether all lock objects included in the selected lock group are displayed on a screen. For example, the electronic device 101 may compare the number of lock objects necessary when a lock release input is provided and the number of lock objects displayed on the current screen.

If all lock objects are not displayed on a screen, as in operation 870, the electronic device 101 may additionally generate a lock object not displayed. In this case, the electronic device 101 may generate an additional lock object with the same or similar size, shape, or color to the currently displayed lock object.

In operation 880, the electronic device 101 may align and display a lock object. According to an embodiment of the present disclosure, the electronic device 101 may align and display lock objects based on the position of the selected object. Alternatively, the electronic device 101 may dispose and display lock objects at designated positions according to a designated order of the lock objects. According to various embodiments of the present disclosure, at least one operation among the above-mentioned operations may be omitted or another operation may be performed additionally. For example, as in operation 860, an operation for determining whether all lock objects included in a lock group are displayed or an operation of aligning lock objects may be omitted.

Figure 9:
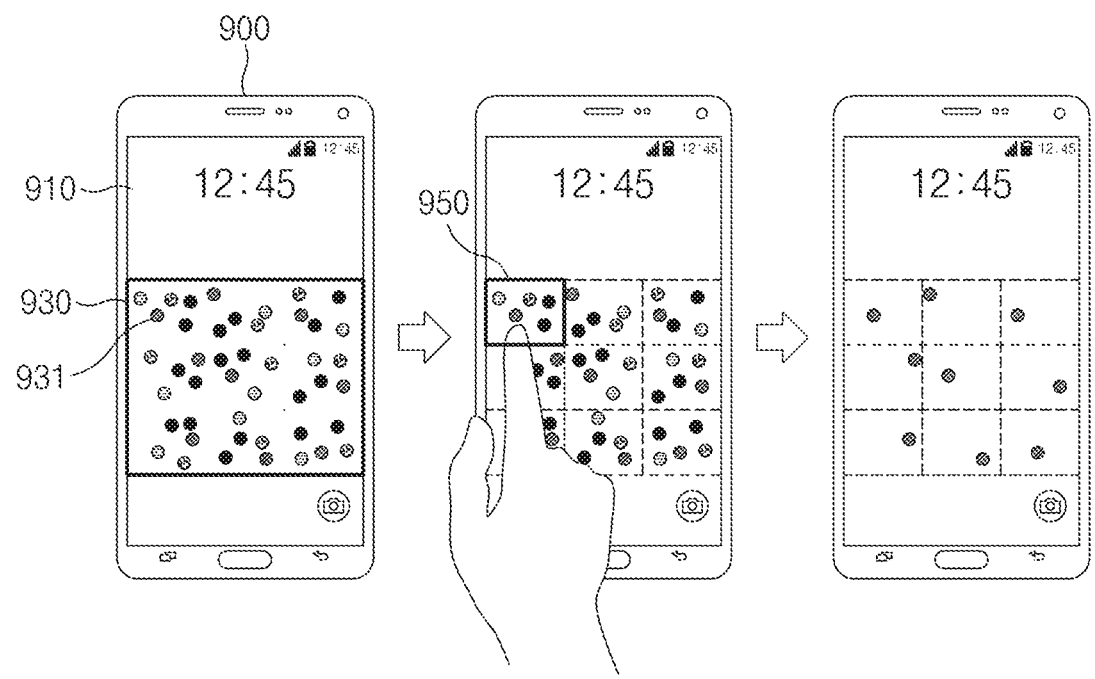
FIG. 9 is a view illustrating a display of a lock object designated by each lock group according to various embodiments of the present disclosure.

FIG. 9 is a view illustrating a display of a lock object designated by each lock group according to various embodiments of the present disclosure.

Referring to FIG. 9, the electronic device 900 may output a background image 910 including at least one object as a first screen of a lock screen. According to an embodiment of the present disclosure, in relation to the background image 910, at least one object 931 may be outputted in a designated area 930 as its display position is changed according to a designated rule. This, as a method of giving vividness to an image, may assign a special effect to an image, for example, effects such as snowing or water drop moving.

According to various embodiments of the present disclosure, the electronic device 900 provides an effect that at least one object 931 moves but limits an area where a corresponding object is able to move, thereby outputting the at least one object 931 while maintaining a designated order when a lock release input is provided. For example, the electronic device 900 may divide a designated area 930 as many as the number of lock objects necessary for a lock release input and perform a control to allow a corresponding object to move only in the divided areas by specifying the divided areas according to a designated order when a lock release input is provided. As shown in the drawing, the electronic device 900 may limit an object (for example, the object 931) designated as a first pattern input object to move only in a first division area 950, and sequentially limit objects designated as corresponding second and third pattern input objects to move in a second division area and a third division area. According to an embodiment of the present disclosure, the electronic device 900 may limit an object moving area but variously specify an object moving speed by each object to produce a more natural movement.

According to various embodiments of the present disclosure, the electronic device 900 may perform a control to allow a corresponding object to be outputted from only a designated division area in addition to how a corresponding object moves in a designated division area (for example, the first division area 950). For example, as if snowflakes fell, a corresponding object (for example, snowflakes) may move from the upper end to the lower end of a designated division area. When snowflakes reach the lower end, the electronic device 900 may terminate the output of a corresponding object and perform a control to output a corresponding object again from the upper end of a division area when a designated time elapses.

According to various embodiments of the present disclosure, as a method of reducing current consumption, the electronic device 900 may output only an area (for example, the designated area 930) where at least one object 931 is displayed instead of outputting the entire background image 910 when the display 160 is turned on. In this case, when a user selects a designated object from at least one object 931 or inputs a password or pattern designated as a lock release input, the electronic device 900 may perform a control to output the entire display 160.

Figure 10:
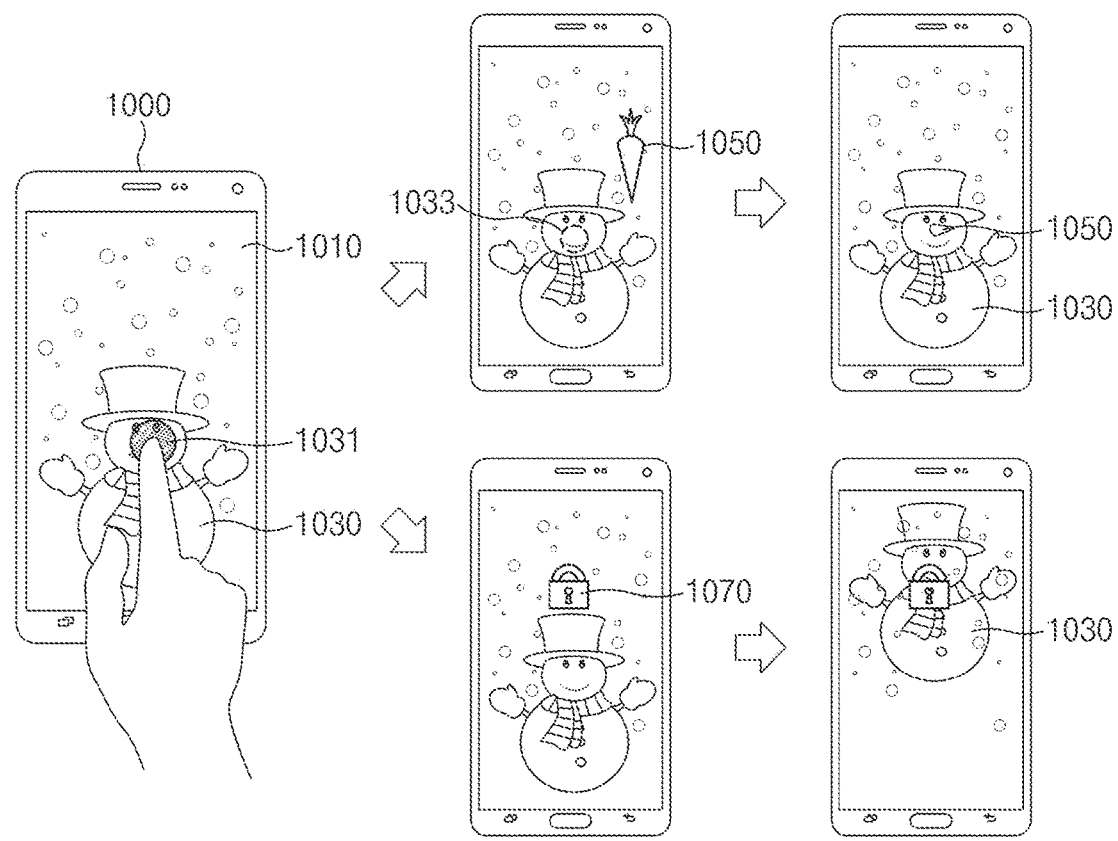
FIG. 10 is a view illustrating an output of a lock screen through an additional object generation according to various embodiments of the present disclosure.

FIG. 10 is a view illustrating an output of a lock screen through an additional object generation according to various embodiments of the present disclosure.

Referring to FIG. 10, the electronic device 1000 may output a first screen of a lock screen designated as a background image 1010. In this case, when a user selects a first object 1030 from the background image 1010 including at least one object, an electronic device 1000 may generate a second screen based on the first object 1030. For example, the electronic device 1000 may configure the second screen by generating a lock object with an image relating to the first object 1030 in correspondence to the selection of the first object 1030.

According to various embodiments of the present disclosure, in relation to the generation of the second screen, the electronic device 1000 may analyze the background image 1010. For example, the electronic device 1000 may extract at least one object configuring the background image 1010. In the drawing shown, the electronic device 1000 may extract snowflakes, a snowman, a hat, a pair of gloves, or a shawl included in the background image 1010. According to various embodiments of the present disclosure, the electronic device 1000 may generate or specify a lock object based on the first object 1030 (for example, a snowman) selected from the extracted objects.

According to various embodiments of the present disclosure, the electronic device 1000 may differently generate a lock object according to the type of the first object 1030 or a selection point 1031 of the first object 1030. For example, the electronic device 1000 may generate a second object having a designated lock release input position and purpose or a third object 1070 meaning a general lock according to the type of the first object 1030 or the selection point 1031 of the first object 1030. In the drawing shown, it is shown on a screen that a carrot-shaped object is generated as the second object 1050 and a lock-shaped object is generated as the third object 1070. For example, when the nose is selected from the snowman-shaped first object 1030, the electronic device 1000 may generate the carrot-shaped second object 1050 and when a point other than the nose is selected, generate the lock-shaped third object 1070. According to an embodiment of the present disclosure, the generated object (for example, the second object 1050 or the third object 1070) may have a differently set security level such as a lock release input and effect according to each property.

In the case of the second object 1050, the electronic device 1000 may specify an input that the second object 1050 moves to the designated point 1033 of the first object 1030 as a lock release input. As shown in the drawing, the lock may be released as the carrot-shaped second object 1050 is moved to the position of the nose that is configured as the designated point 1033 of the snowman-shaped first object 1030. In this case, when the carrot is moved toward the face of the snowman, the angle of the carrot is moved from a vertical direction to a horizontal direction or three-dimensionally, so that its position or shape may be changed in a way of not providing sense of difference to an existing image as much as possible. As another example, if there is no pair of gloves at the both hands of the snowman and a grove is generated as the second object 1050, as the grove is moved to the hand of the snowman, the lock may be released.

In the case of the third object 1070, the electronic device 1000 may specify an input for selecting the third object 1070 or specify an input for touching the third object 1070 or the first object 1030 and then moving (for example, dragging) them to a designated position, as a lock release input. As shown in the drawing, unlike the carrot generated as the second object 1050, in the case of the lock generated as the third object 1070, since the lock may be a security related object explicitly, the lock may be released by simply touching the lock or dragging the lock to a designated position after touching it.

According to various embodiments of the present disclosure, the electronic device 1000 may generate and output the second object 1050 and the third object 1070 together. Alternatively, the electronic device 1000 may generate and output a plurality of second objects 1050 or a plurality of the third objects 1070. In this case, the electronic device 1000 may differently configure a security level or a support function according to the type of a lock object that is selected as a lock release input and moved among the generated lock objects. For example, when the lock is released by moving the second object 1050, the electronic device 1000 may support a general function and unlike this, when the lock is released by moving the third object 1070, support a special function such as a power saving function, a security function, a limit function, or a kid's function. According to various embodiments of the present disclosure, an additional lock object may be generated according voice information, a gesture input, or the type of an electronic device.

Figure 11:
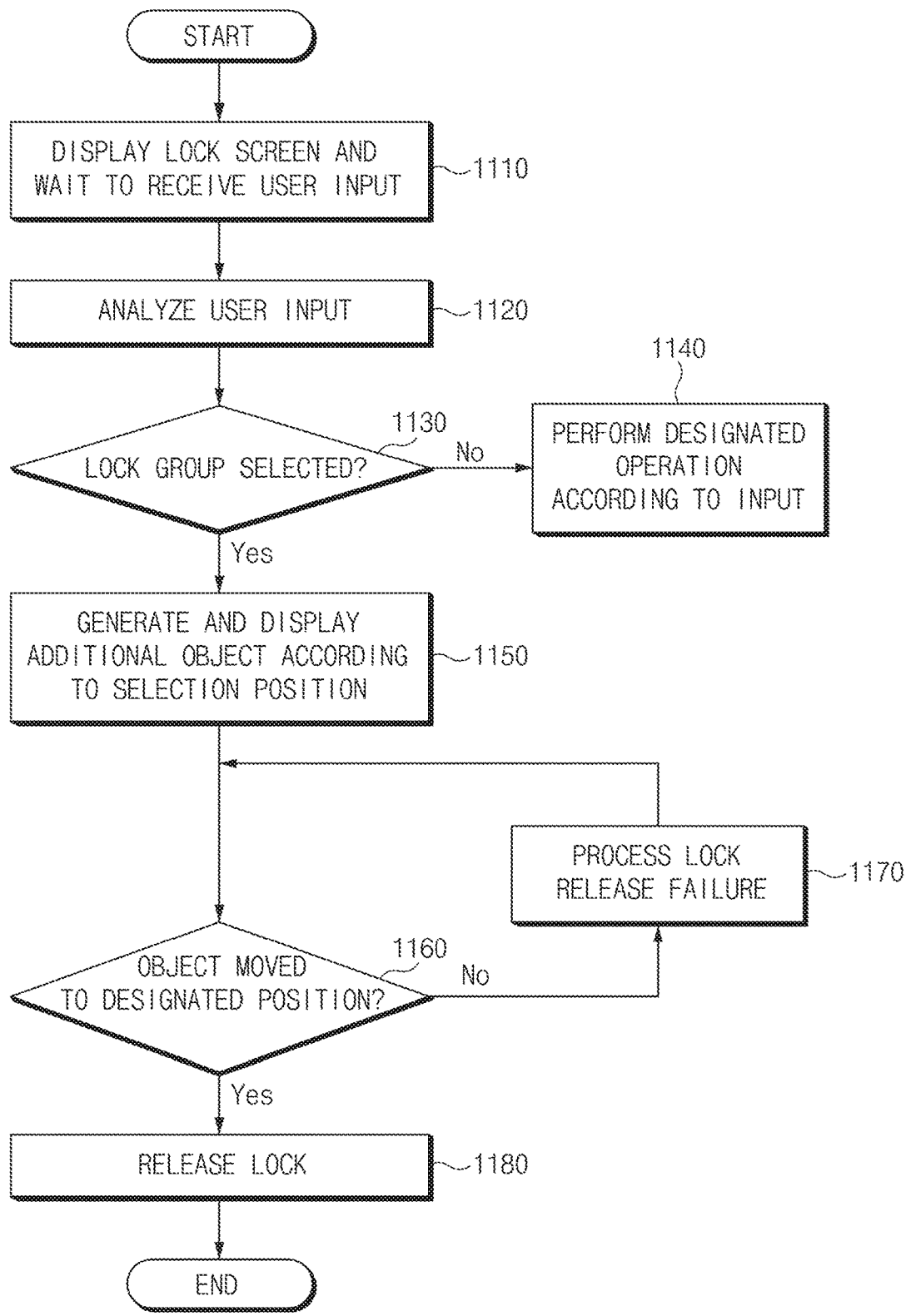
FIG. 11 is a flowchart illustrating an operating method of an electronic device relating to an output of a lock screen through additional object generation according to various embodiments of the present disclosure.

FIG. 11 is a view illustrating an operating method of an electronic device relating to an output of a lock screen through additional object generation according to various embodiments of the present disclosure.

Referring to FIG. 11, in operation 1110, the electronic device 101 may display a first screen of a lock screen at a designated time point, for example, a time point that the display 160 (illustrated in FIG. 1) is turned on from a turn-off state or a time point that a designated application is selected. According to various embodiments of the present disclosure, the electronic device 101 may wait to receive a security processing related user input.

When a user input is received, as in operation 1120, the electronic device 101 may analyze the user input. In operation 1130, the electronic device 101 may determine whether the user input is an input for selecting a designated position. For example, the electronic device 101 may determine whether a designated area of the first screen is selected or whether a designated object included in a background image configuring the first screen is selected. If the designated position is not selected, in operation 1140, the electronic device 101 may perform a designated operation according to the user input.

When the designated position is selected, in operation 1150, the electronic device 101 may configure a second screen of a lock screen by generating an additional object according to a selection position, and output the second screen.

According to an embodiment of the present disclosure, the electronic device 101 may dispose and output the generated additional object on the first screen. According to an embodiment of the present disclosure, the electronic device 101 may select and generate a special object having a designated lock release input position and purpose according to a selection position or a general object that means a general lock.

In operation 1160, the electronic device 101 may determine whether the generated additional object is moved to the designated position. For example, the electronic device 101 may determine whether a movement position (for example, coordinates information) of an additional object is included within a predetermined range of a position designated as a lock release input.

When an additional object according to various embodiments of the present disclosure is not moved to a designated position, as in operation 1170, the electronic device 101 may perform lock release failure processing. In this case, the electronic device 101 may maintain a state of outputting the second screen of the lock screen as it is or may return to a state of outputting the first screen.

When an additional object according to various embodiments of the present disclosure is moved to a designated position, as in operation 1180, the electronic device 101 may release the lock. In this case, the electronic device 100 may terminate the output of the lock screen, and output a designated screen (for example, a home screen) or a screen before lock setting.

Figure 12:
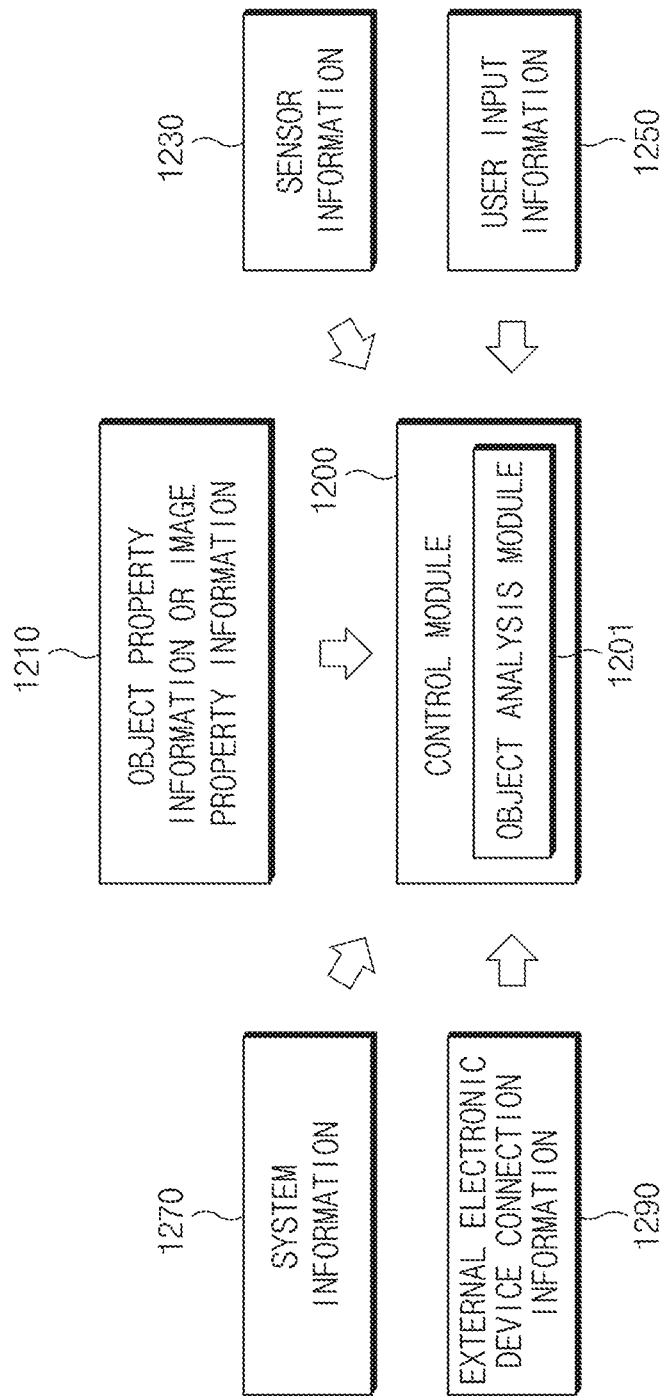
FIG. 12 is a view illustrating an additional object generation according to various embodiments of the present disclosure.

FIG. 12 is a view illustrating an additional object generation according to various embodiments of the present disclosure.

Referring to FIG. 12, the control module 1200 may analyze a background image that a user selects based on the object analysis module 1201, and generate a corresponding background image related object according to the analyzed information. For example, when a background image including a soccer goalpost and a soccer player is selected in relation to soccer, the control module 1200 may generate a soccer ball as a lock object. The control module 1200 may have the same or similar configuration to the processor 120 or the security processing module 190 of FIG. 1.

According to various embodiments of the present disclosure, the control module 1200 may utilize a variety of information when generating an additional object. For example, the control module 1200 may generate an additional object by utilizing image property information (for example, a theme, a background, or an artist) or property information 1210 (for example, the type of an object (for example, a person, an animal, or an object)), sensor information 1230 (for example, terminal state information), user input information 1250 (for example, an input method or an input target), system information 1270 (for example, time information, or event information), or external electronic device connection information 1290 (for example, connection information of a server or a wearable device).

According to an embodiment of the present disclosure, when a selected object is a transportation (for example, a vehicle) related object based on a property determine result and a time selected by utilizing time information in system information is a daytime, the control module 1200 may generate a vehicle image with a turned off light as an additional object and when the time is a nighttime, generate a vehicle image with a turned on light as an additional object.

Figure 13:
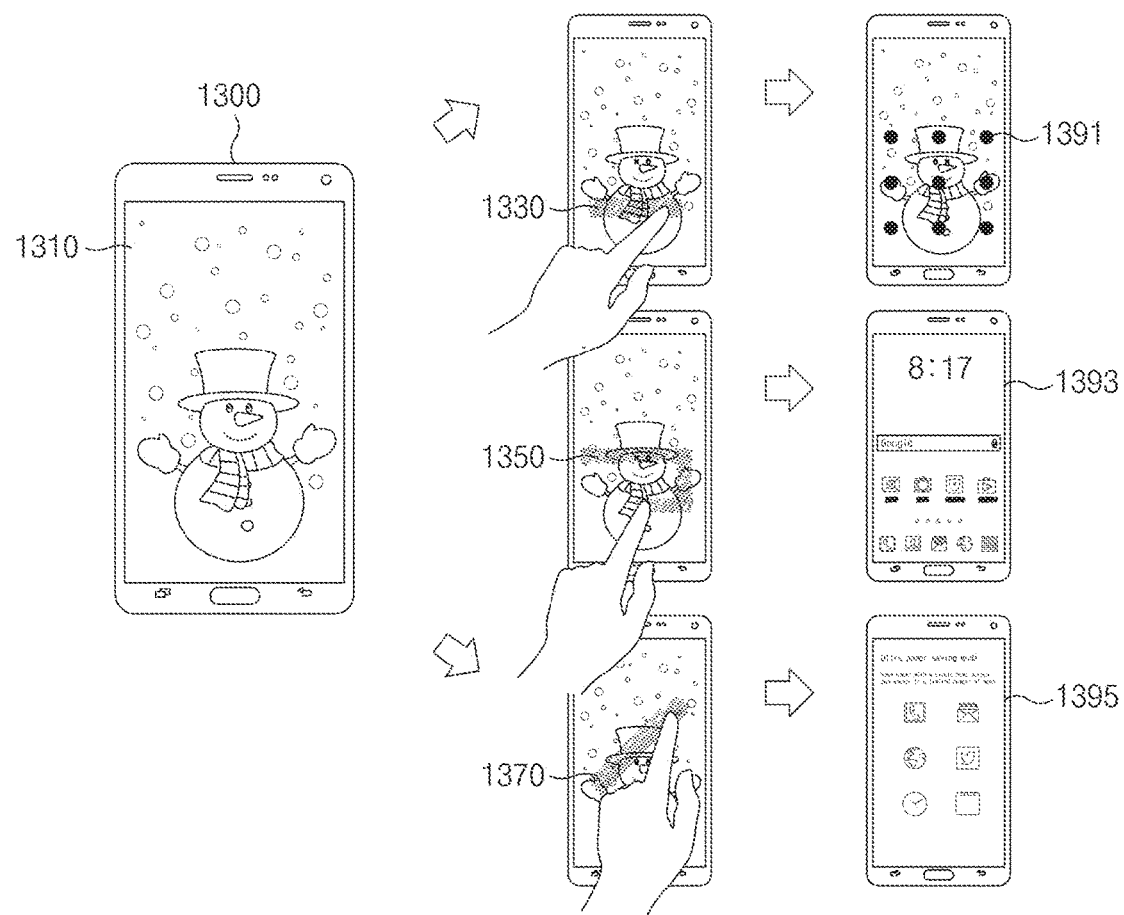
FIG. 13 is a view illustrating user input processing through a first screen of a lock screen according to various embodiments of the present disclosure.

FIG. 13 is a view illustrating user input processing through a first screen of a lock screen according to various embodiments of the present disclosure.

Referring to FIG. 13, the electronic device 1300 may specify a background image 1310 as a first screen of a lock screen and output it. According to an embodiment of the present disclosure, when the first screen is outputted for more than a designated time, the electronic device 1300 may output a second screen configured with at least one lock object 1391. Alternatively, when a designated user input 1330 occurs in a state that the first screen is outputted, the electronic device 1300 may output the second screen. For example, the electronic device 1300 may output the second screen in correspondence to an input for touching an arbitrary point of the first screen or an input for moving an arbitrary point of the first screen in a designated direction while touching the arbitrary point.

According to various embodiments of the present disclosure, in a case that a lock release input is a pattern input, when a lock release pattern 1350 configured as a lock release input is inputted in a state that the first screen is outputted, the electronic device 1300 may omit the output of the second screen and output a designated screen 1393 (for example, a home screen). In this case, when the form of an inputted pattern is similar to identical compared to the lock release pattern 1350, the electronic device 1300 may release the lock. Alternatively, when a pattern is inputted within an area in a designated threshold from a point where a lock release pattern is required to be inputted, the electronic device 1300 may release the lock.

According to various embodiments of the present disclosure, in a case that a lock release input is a pattern input, when another pattern 1370 other than the lock release pattern 1350 is inputted in a state that the first screen is outputted, the electronic device 1300 may output the second screen or omit the output of the second screen and output a designated function screen 1395 (for example, a power saving function screen, a security function screen, a limit function screen, or a kid's function screen). In addition, when various inputs, for example, a gesture input, voice information, or a fingerprint recognition, are received in a state that the first screen is outputted, the electronic device 1300 may output the second screen, a designated screen, or a designated function screen.

Figure 14:
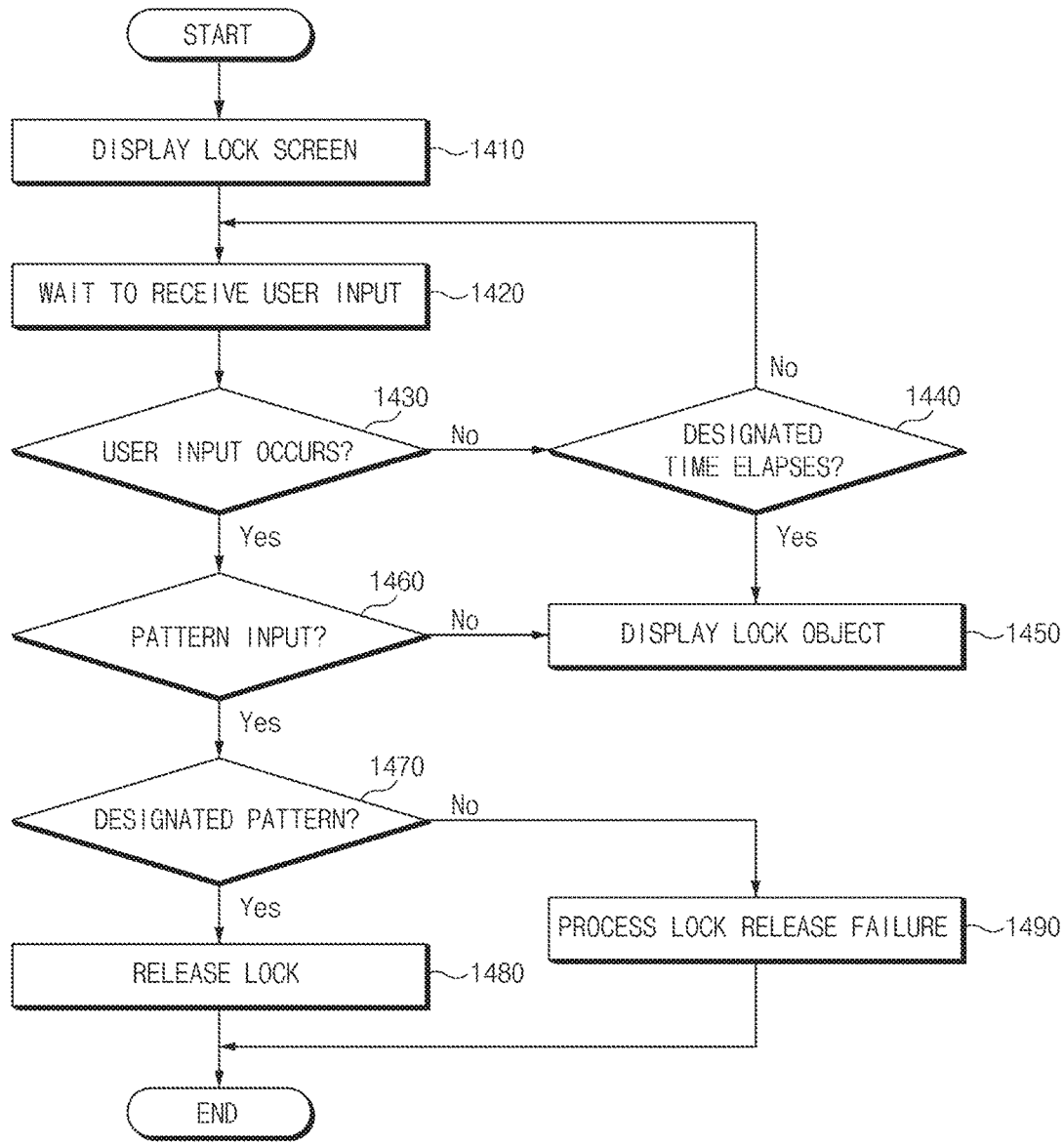
FIG. 14 is a flowchart illustrating an operating method of an electronic device relating to user input processing through a first screen of a lock screen according to various embodiments of the present disclosure.

FIG. 14 is a flowchart illustrating an operating method of an electronic device relating to user input processing through a first screen of a lock screen according to various embodiments of the present disclosure.

Referring to FIG. 14, in operation 1410, the electronic device 101 (illustrated in FIG. 1) may display a first screen of a lock screen. In operation 1420, the electronic device 101 may wait to receive a security processing related user input.

In operation 1430, the electronic device 101 may determine whether a user input occurs. If a user input does not occur, in operation 1440, the electronic device 101 may determine whether a designated time elapses. If the designated time does not elapse, the electronic device 101 may return to operation 1420 to wait to receive a user input. If the designated time elapses, in operation 1450, the electronic device 101 may display a second screen configured with at least one lock object.

If a user input occurs, in operation 1460, the electronic device 101 may determine whether the user input is a pattern input. If the user input is not a pattern input, the electronic device 101 may display the second screen. If the user input is a pattern input, in operation 1470, the electronic device 101 may determine whether an inputted pattern is a designated pattern, for example, a lock release pattern configured as a lock release input.

If the inputted pattern is a lock release pattern, in operation 1480, the electronic device 101 may release the lock. For example, the electronic device 101 may omit the output of the second screen and output a designated screen (for example, a home screen). If the inputted pattern is not a lock release pattern, in operation 1490, the electronic device 101 may perform lock release failure processing. For example, the electronic device 101 may maintain a state of outputting the first screen, or output the second screen, or omit the output of the second screen and output a designated function screen (for example, a power saving function screen, a security function screen, a limit function screen, or a kid's function screen).

Figure 15A:
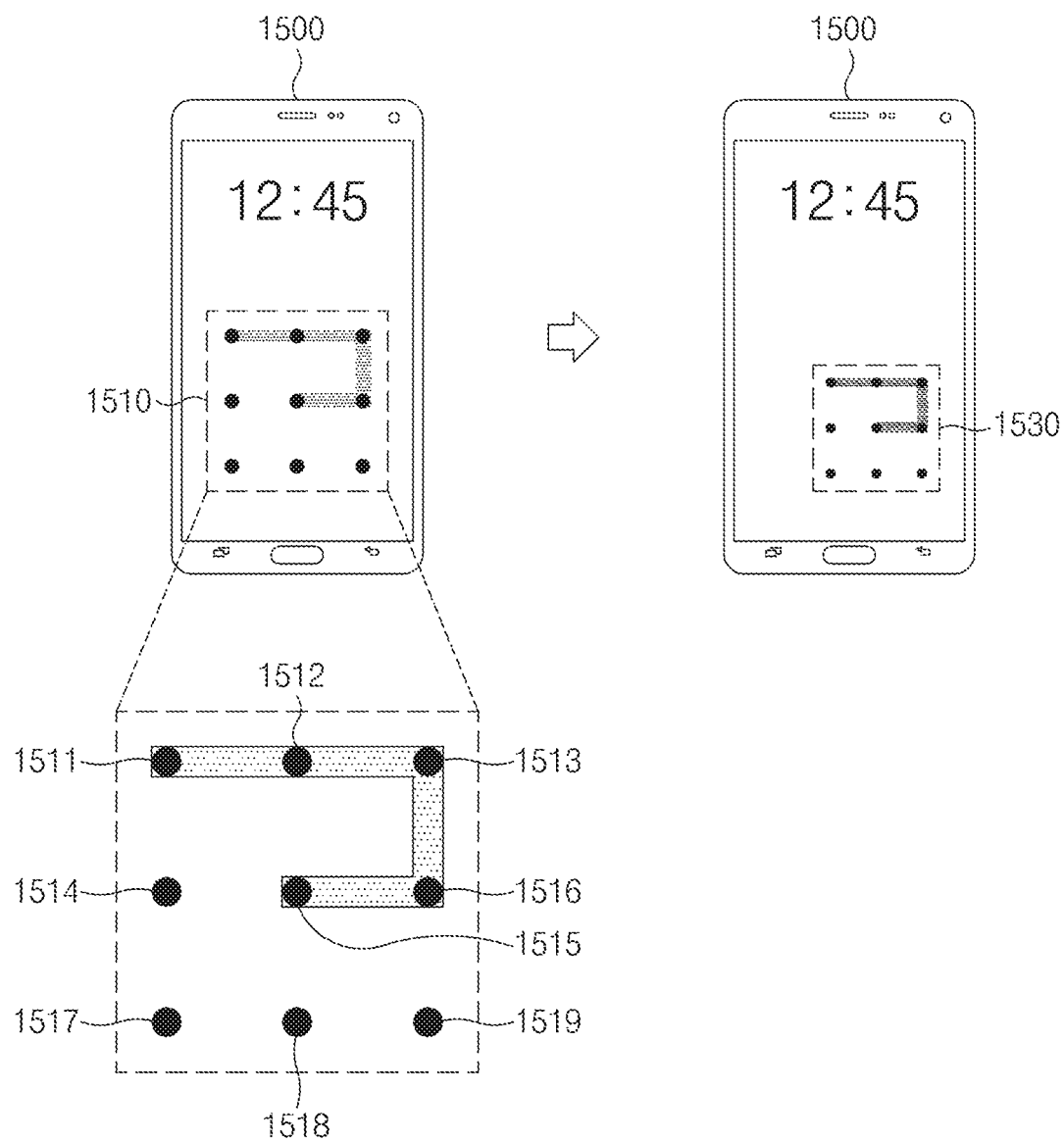
FIG. 15A is a view illustrating a size and position change of a lock object when the lock is released through a pattern input according to various embodiments of the present disclosure.

FIG. 15A is a view illustrating a size and position change of a lock object when the lock is released through a pattern input according to various embodiments of the present disclosure. The electronic device 1500 may modify and apply a lock release pattern configured as a lock release input according to the type of the electronic device 1500, the size of a display included in the electronic device 1500, or usage setting information (for example, one-hand function setting) of the electronic device 1500. Through this, even if lock objects are not selected according to an actually configured lock release pattern, the electronic device 1500 may perform a control to release the lock.

Referring to FIG. 15A, the electronic device 1500 may modify and output an area 1510 where lock objects (for example, a first lock object 1511 to a ninth lock object 1519) are configured. For example, when a lock release pattern is inputted, the electronic device 1500 may output a modified area 1530, which is reduced to be relatively small, instead of the area 1510 where lock objects are configured. As mentioned above, even if the area 1510 where lock objects are configured is modified and outputted, a lock release pattern configured as a lock release input, for example, a selection order of lock objects, may not be changed.

Figure 15B:
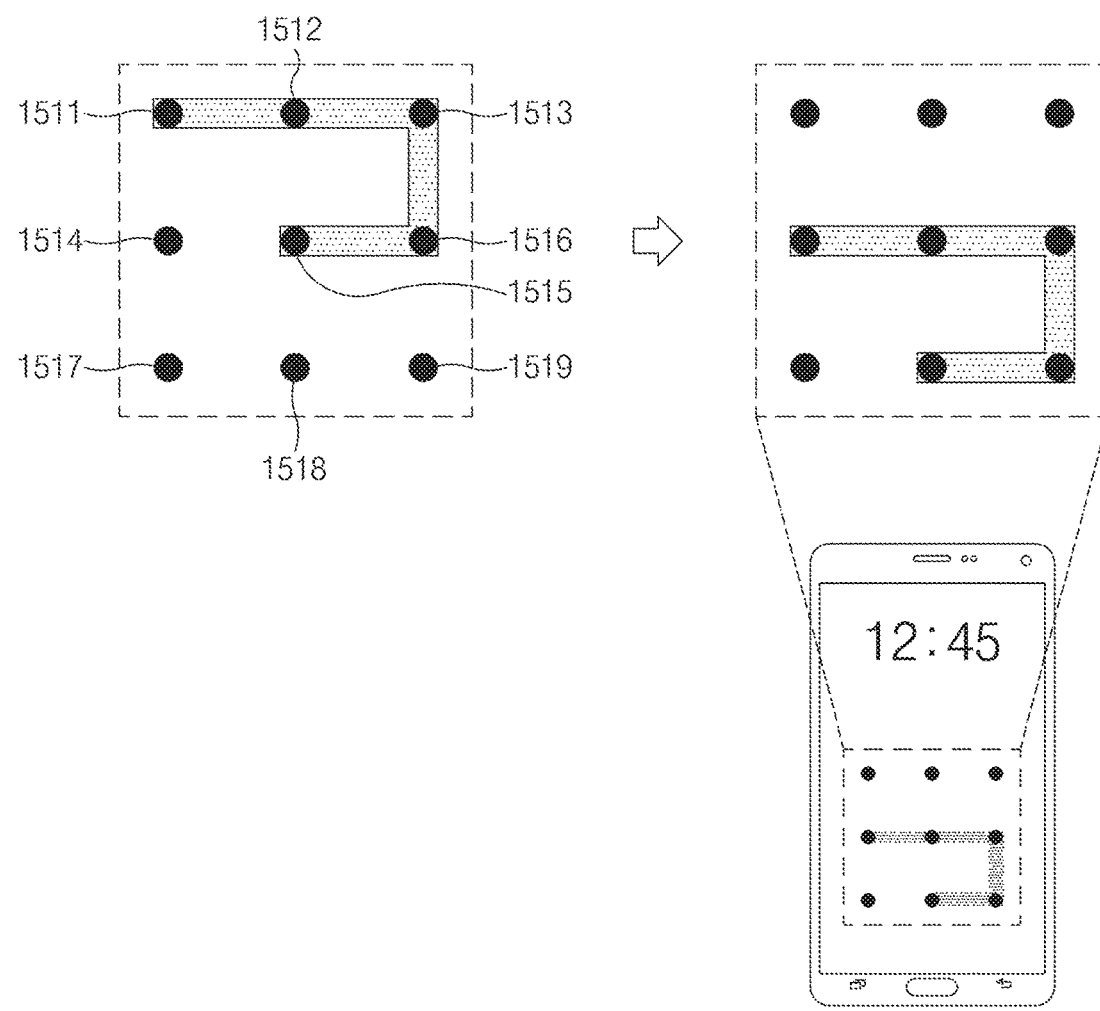
FIG. 15B is a view illustrating a position change of a pattern configured as a lock release input when the lock is released through a pattern input according to various embodiments of the present disclosure.

FIG. 15B is a view illustrating a position change of a pattern configured as a lock release input when the lock is released through a pattern input according to various embodiments of the present disclosure.

Referring to FIG. 15B, the electronic device 1500 may change and apply the position of a lock release pattern. For example, the electronic device 1500 may apply a lock release pattern having the same form but only with a different pattern start point than a configured lock release pattern, by changing only the position of the lock release pattern. As shown in the drawing according to various embodiments of the present disclosure, when a lock release pattern is configured in the order of a second lock object 1512, a third lock object 1513, a sixth lock object 1516, and a fifth lock object 1515 as starting from the first lock object 1511, the electronic device 1500 may change that pattern start position to the fourth lock object 1514 and apply the shape of the pattern identically. For example, the electronic device 1500 may apply a lock release pattern designated in the order of the fifth lock object 1515, the sixth lock object 1516, the ninth lock object 1519, and the eighth lock object 1518 as starting from the fourth lock object 1514.

Figure 15C:
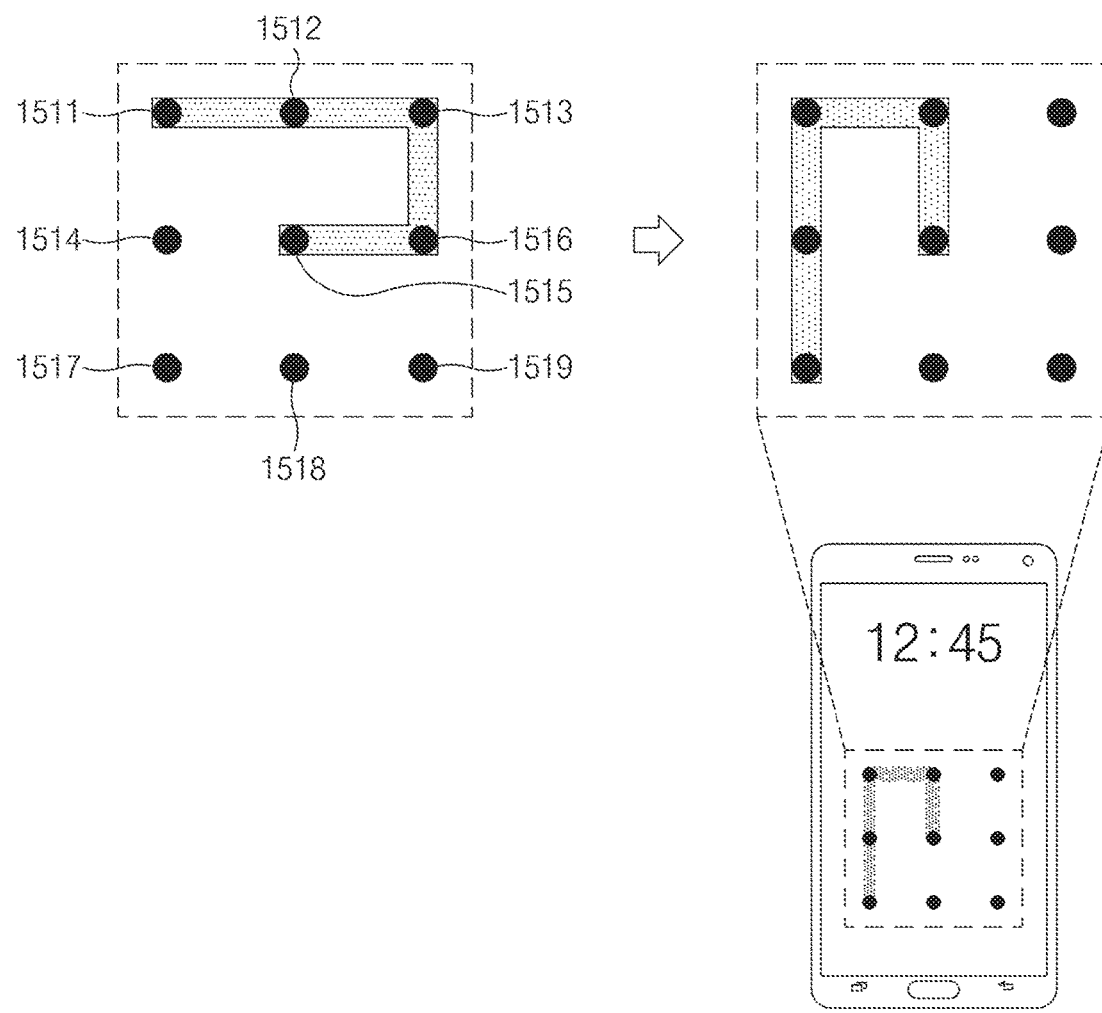
FIG. 15C is a view illustrating an angle change of a pattern configured as a lock release input when the lock is released through a pattern input according to various embodiments of the present disclosure.
Figure 15D:
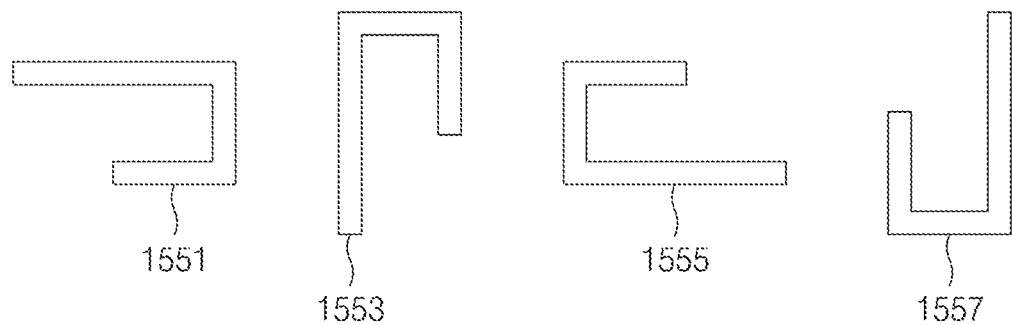
FIG. 15D is a view illustrating an angle change of a lock release pattern by rotating the lock release pattern according to various embodiments of the present disclosure.

FIG. 15C is a view illustrating an angle change of a pattern configured as a lock release input when the lock is released through a pattern input according to various embodiments of the present disclosure. FIG. 15D is a view illustrating an angle change of a lock release pattern by rotating the lock release pattern according to various embodiments of the present disclosure.

Referring to FIG. 15C and FIG. 15D, the electronic device 1500 may change and apply the angle of a lock release pattern. For example, the electronic device 1500 may change the angle of the lock release pattern and change the pattern start position according thereto, so that it may apply a lock release pattern having the same form but a different start point and progressing direction than the lock release pattern.

As shown in FIG. 15D according to various embodiments of the present disclosure, the electronic device 1500 may apply a lock release pattern, for example, a pattern 1553 obtained by rotating the lock release pattern 1551 counterclockwise by 90 degrees, a 180-degree rotated pattern 1555, or a 270-degree rotated pattern 1557.

As shown in FIG. 15C, when the pattern 1553 obtained by rotating the lock release pattern 1551 counterclockwise by 90 degrees is applied, the electronic device 1500 may counterclockwise rotate the lock release pattern 1551 configured in the order of the second lock object 1512, the third lock object 1513, the sixth lock object 1516, and the fifth lock object 1515 as starting from the first lock object 1511, and change the pattern start position according thereto to the seventh lock object 1517. The electronic device 1550 may change a pattern progressing direction from a direction that progresses from the left to the right to a counterclockwise 90-degree rotated direction, that is, a direction that progresses from the bottom to the top. Through this, the electronic device 1500 may apply a lock release pattern configured in the order of the fourth lock object 1514, the first lock object 1511, the second lock object 1512, and the fifth lock object 1515 as starting from the seventh lock object 1517. According to various embodiments of the present disclosure, the electronic device 1500 may combine a modification of an area where lock objects are configured, a position change of a lock release pattern, and an angle change of a lock release pattern and apply it.

Figure 16:
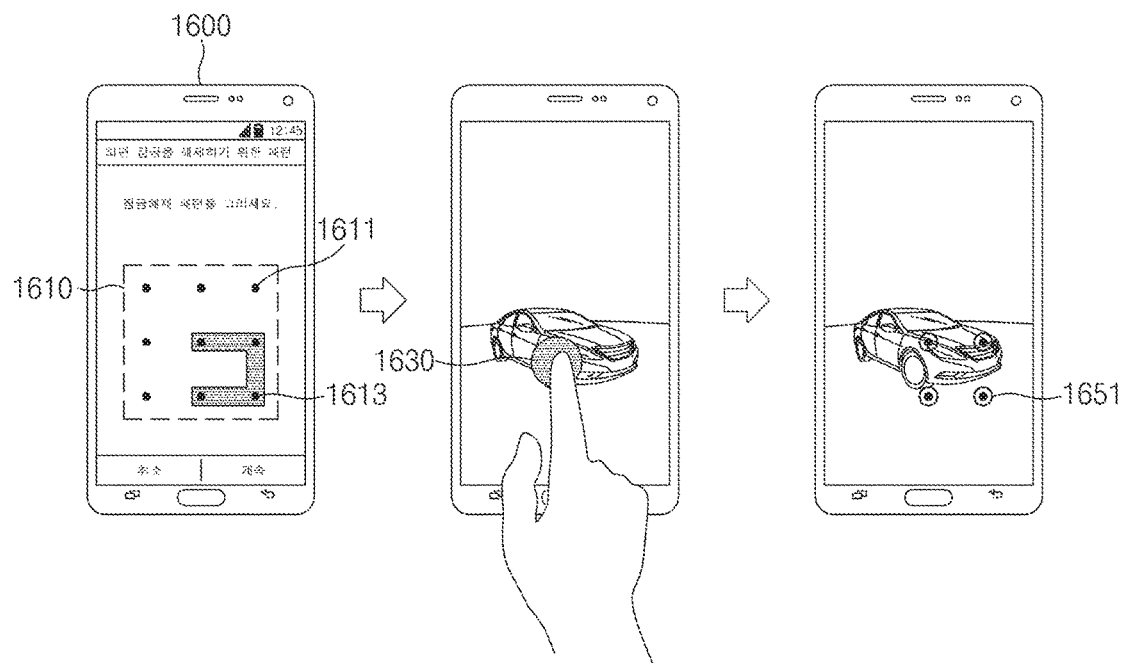
FIG. 16 is a view illustrating a screen for displaying a part of a lock object according to setting information corresponding to a lock release input according to various embodiments of the present disclosure.

FIG. 16 is a view illustrating a screen for displaying a part of a lock object according to setting information corresponding to a lock release input according to various embodiments of the present disclosure.

Referring to FIG. 16, the electronic device 1600 may configure a lock release pattern through a lock release pattern setting screen. According to various embodiments of the present disclosure, the electronic device 1600 may output a second screen of a lock screen configured with lock objects 1611 to a display. According to various embodiments of the present disclosure, the electronic device 1600 may configure and output the second screen by using only the lock objects 1613 that are actually used as a lock release pattern in the area 1610 configured with lock objects. For example, when a designated object 1630 is selected from an image including at least one object, the electronic device 1600 may output the second screen configured with a new lock object 1651 to correspond to the lock object 1613 that is actually used as a lock release pattern. In this case, since the actually used lock objects 1613 are easily exposed, a security level may be decreased but the electronic device 1600 may increase a security level by using a linkage with an additional device, for example, using a corresponding function in linkage with an authenticated wearable device.

Figure 17:
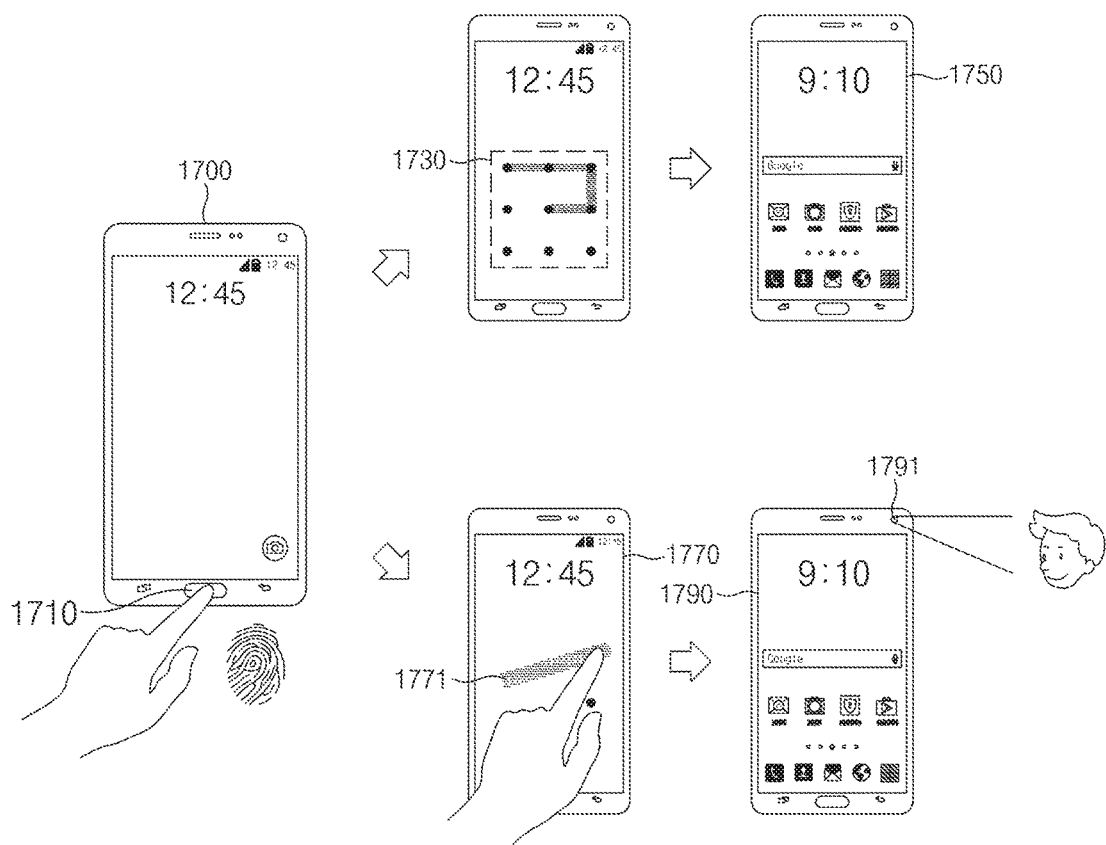
FIG. 17 is a view illustrating an output of a lock screen configured in correspondence to a biometric information input according to various embodiments of the present disclosure.

FIG. 17 is a view illustrating an output of a lock screen configured in correspondence to a biometric information input according to various embodiments of the present disclosure.

Referring to FIG. 17, an electronic device 1700 may collect biometric information based on a sensor 1710. For example, the electronic device 1700 may collect fingerprint information based on a fingerprint recognition sensor. When an authenticated user is checked through the collected biometric information, the electronic device 1700 may omit the output of a lock screen and output a designated screen 1750 (for example, a home screen). Alternatively, the electronic device 1700 may output a second screen configured with lock objects 1730 according to a security level. If setting information corresponding to a lock release input is inputted through the second screen, the electronic device 1700 may terminate the output of the second screen and output the designated screen 1750.

If the collected biometric information is not recognized or is not the authenticated user's biometric information, the electronic device 1700 may maintain the output of the first screen of the lock screen as it is, or output the second screen, or output a fake lock screen 1770. When the fake lock screen 1770 is outputted, even if a user who is not authenticated inputs any lock release input 1771, the electronic device 1700 may perform a control to output a designated function screen, for example, a security function screen 1790. According to an embodiment of the present disclosure, when the security function screen 1790 is outputted, the electronic device 1700 may perform a control to take a picture of an unauthenticated user by operating a camera 1791.

Figure 18:
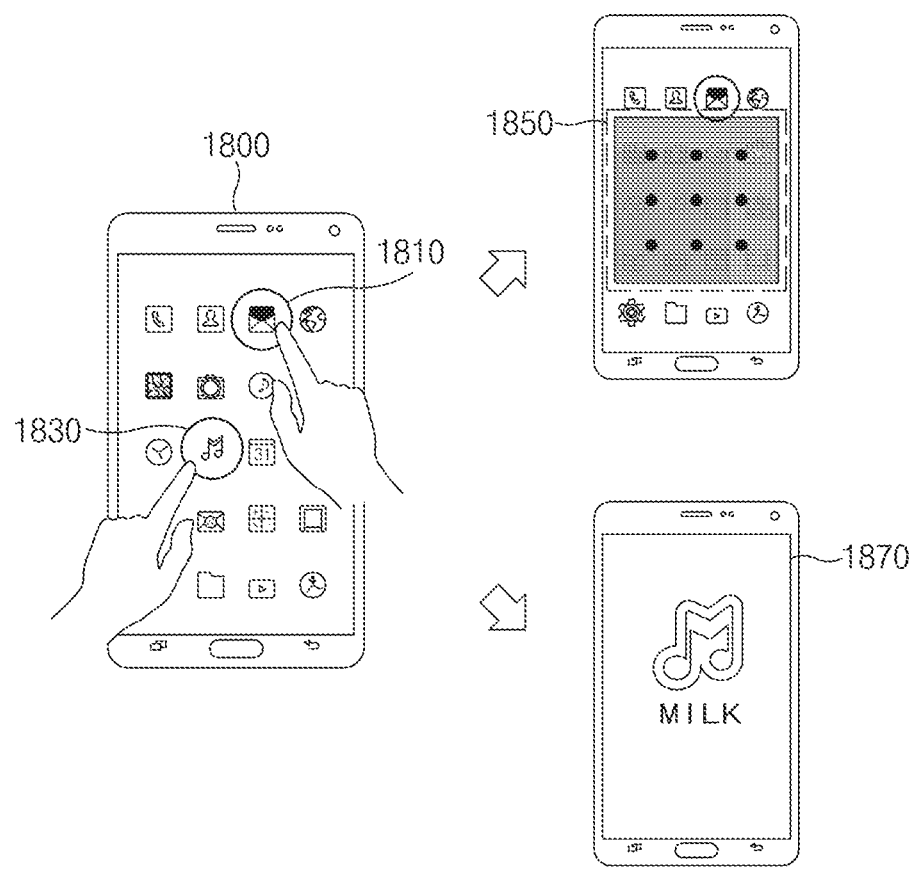
FIG. 18 is a view illustrating an output of a lock screen depending on setting information of an application according to various embodiments of the present disclosure.

FIG. 18 is a view illustrating an output of a lock screen depending on setting information of an application according to various embodiments of the present disclosure.

Referring to FIG. 18, the electronic device 1800 may control the output of a lock screen according to setting information of an application. For example, when whether to use a lock screen is configured in setting information of an application, the electronic device 1800 may control the output of the lock screen according to corresponding information. As shown in the drawing according to various embodiments of the present disclosure, when an application 1810 configured to use a lock screen is selected, the electronic device 1800 may output the second screen of the lock screen configured with lock object 1850 before the execution of the application 1810.

According to various embodiments of the present disclosure, the electronic device 1800 may output the second screen based on coordinates designated as a display start position of the lock objects 1850. According to another embodiment of the present disclosure, the electronic device 1800 may output the second screen based on an execution icon display position of the application 1810 or a touch coordinate where a user input occurs.

According to various embodiments of the present disclosure, in a state that the second screen is outputted, when setting information corresponding to a lock release input is inputted, the electronic device 1800 may execute the application 1810. Alternatively, when information different from setting information corresponding to a lock release input is inputted, the electronic device 1800 may maintain the output of the second screen as it is, or terminate the output of the second screen and return to a previous screen.

According to various embodiments of the present disclosure, when an application 1830 configured not to use a lock screen is selected, the electronic device 1800 may execute the application 1830 and output an execution screen 1870 of the application 1830.

According to various embodiments of the present disclosure, in the case of an application that requires a high level security according to a security level, the electronic device 1800 may be configured to use a lock screen. For example, when a high level security is required such as a finance related application, the electronic device 1800 may be configured to use a lock screen.

Figure 19A:
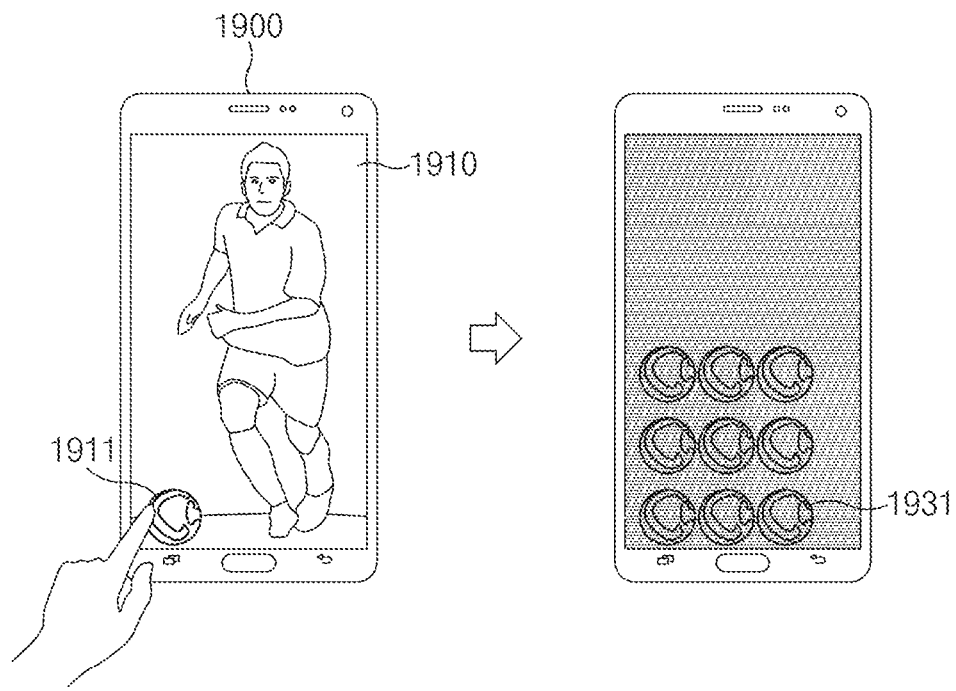
FIG. 19A is a view illustrating a screen that configures a lock screen differently depending on a theme image according to various embodiments of the present disclosure.
Figure 19B:
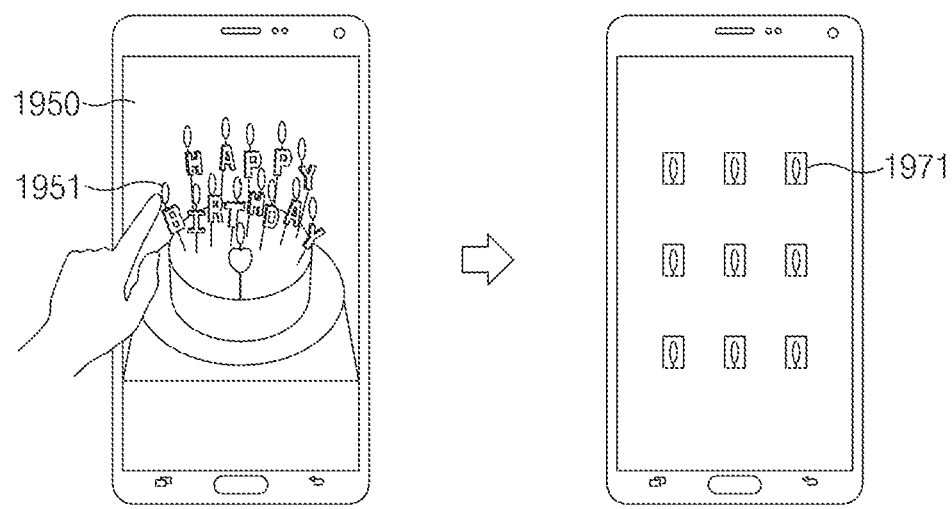
FIG. 19B is a view illustrating a screen that configures a lock screen differently depending on a background image according to various embodiments of the present disclosure.

FIG. 19A is a view illustrating a screen that configures a lock screen differently depending on a theme image according to various embodiments of the present disclosure. FIG. 19B is a view illustrating a screen that configures a lock screen differently depending on a background image according to various embodiments of the present disclosure.

Referring to FIG. 19A and FIG. 19B, the electronic device 1900 may configure a lock screen differently according to a theme image 1910 or a background image 1950. For example, when a theme is set to soccer and accordingly the theme image 1910 is configured with a soccer player and a soccer ball, the electronic device 1900 may generate a lock object with an image relating to the theme, that is, soccer, to configure a lock screen.

As shown in FIG. 19A, the electronic device 1900 may configure the theme image 1910 as the first screen of the lock screen. According to another embodiment of the present disclosure, when a designated object 1911 (for example, a soccer ball) in the theme image 1910 is selected, the electronic device 1900 may output the second screen of the lock screen by configuring the lock object 1931 with an image (for example, a soccer ball image, a soccer shoes image, a uniform image, or a soccer team emblem image) relating to the designated object 1911.

According to various embodiments of the present disclosure, the electronic device 1900 may configure a lock screen differently according to a background image 1950. For example, when the background image 1950 is configured with a birthday cake and a candle, the electronic device 1900 may generate a lock object with an image relating to the background image 1950, that is, a birthday related image, to configure a lock screen.

As shown in FIG. 19B, the electronic device 1900 may configure the background image 1950 as the first screen of the lock screen. According to various embodiments of the present disclosure, when a designated object 1951 (for example, a candle) is selected from the background image 1950 including at least one object, the electronic device 1900 may output the second screen of the lock screen by configuring the lock object 1971 with an image (for example, a candle image) relating to the selected object 1951.

Figure 20A:
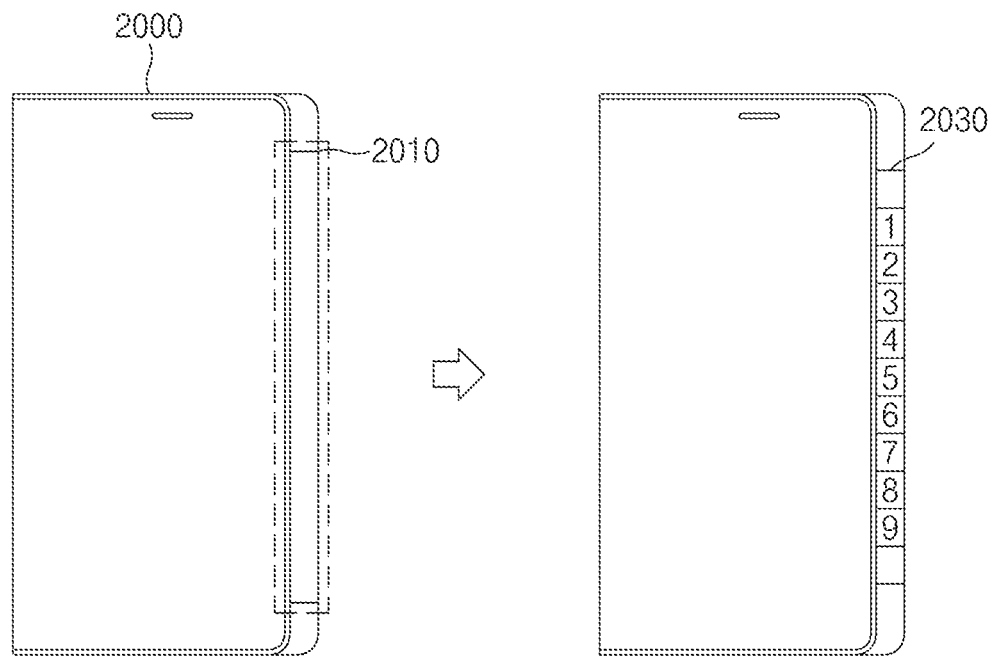
FIG. 20A is a view illustrating a screen that configures a lock screen differently depending on the type of an electronic device or the size of a display according to various embodiments of the present disclosure.

FIG. 20A is a view illustrating a screen that configures a lock screen differently depending on the type of an electronic device or the size of a display according to various embodiments of the present disclosure.

Figure 20B:
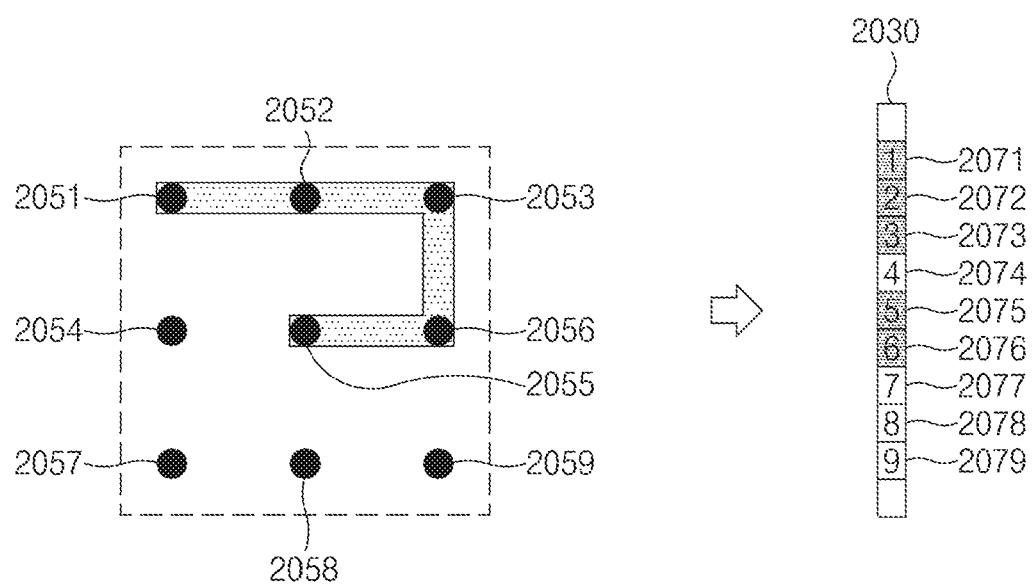
FIG. 20B is a view illustrating a type change of a lock object according to various embodiments of the present disclosure.

FIG. 20B is a view illustrating a type change of a lock object according to various embodiments of the present disclosure.

Referring to FIG. 20A and FIG. 20B, the electronic device 2000 may configure a lock screen differently according to the type of the electronic device 2000 or the size of a display. For example, when the size of a display is small or the area of a display where a lock screen is displayed is small such as a wearable device, the electronic device 2000 may configure a lock screen differently.

As shown in FIG. 20A, when the area 2010 of a display where a lock screen is displayed is small, for example, when a lock screen is displayed in an edge area of a display or a lock screen is displayed in a display area corresponding to a transparent portion of a cover, the electronic device 2000 may configure a lock screen differently. According to another embodiment of the present disclosure, when a lock screen is displayed according to a designated condition, for example, when a lock screen cannot be displayed on the display of the main screen (such as when a cover is closed or when only an edge screen is turned on), the electronic device 2000 may configure the lock screen differently and display it.

According to various embodiments of the present disclosure, the electronic device 2000 may change the type of a lock object. For example, the electronic device 2000 may change a pattern input object into a password input object or change a password input object into a pattern input object.

As shown in FIG. 20B, the electronic device 2000 may change a pattern input object into a password input object 2030 to output it to the area 2010 of the display. For example, when the lock release pattern is configured in the order of a second pattern input object 2052, a third pattern input object 2053, a sixth pattern input object 2056, and a fifth pattern input object 2055 as starting from a first pattern input object 2051, the electronic device 2000 may change the first pattern input object 2051 to a ninth pattern input object 2059 to a first password input object 2071 to a ninth pattern input object 2079, and configure the lock release password in the order of the first password input object 2071, the second password input object 2072, the third password input object 2073, the sixth password input object 2076, and the fifth password input object 2075.

According to an embodiment of the present disclosure, the electronic device 2000 may perform a lock release operation with a pattern or a password configured as a lock release input by a user. The electronic device 2000 may differently apply a lock release input according to the type of a currently configured lock object. For example, a user may configure the order of the first pattern input object 2051, the second pattern input object 2052, the third pattern input object 2053, the sixth pattern input object 2056, and the fifth pattern input object 2055 as a lock release pattern, and configure the order of the first password input object 2071, the eighth password input object 2078, the ninth password input object 2079, and the fourth password input object 2074 as a lock releases password. In this case, when the type of a lock object changes from a pattern input object to a password input object, the electronic device 2000 may perform a lock release operation if the first password input object 2071, the eighth password input object 2078, the ninth password input object 2079, and the fourth password input object 2074 are selected in the order.

According to various embodiments of the present disclosure, when a password input object corresponding to a designated number is selected in an output state of a password input object, the electronic device 2000 may change a font style such as a background color or a font color of a corresponding password input object and output it.

Figure 20C:
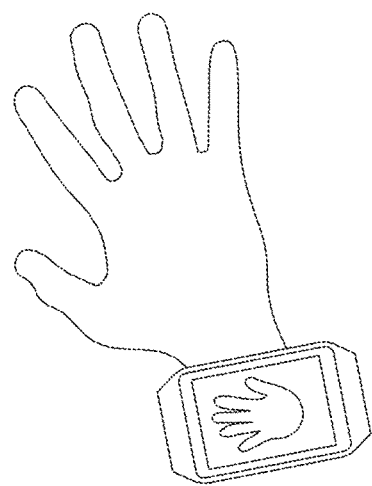
FIG. 20C is a view illustrating another screen that configures a lock screen differently depending on the type of an electronic device or the size of a display according to various embodiments of the present disclosure.
Figure 20C:
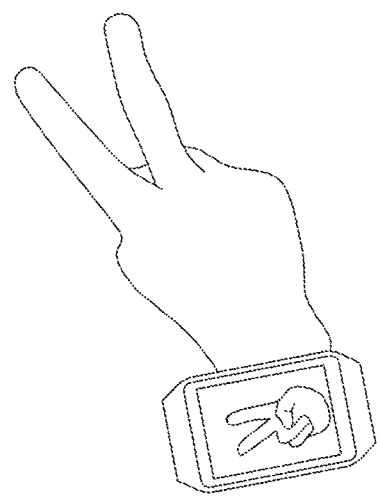
Figure 20C:
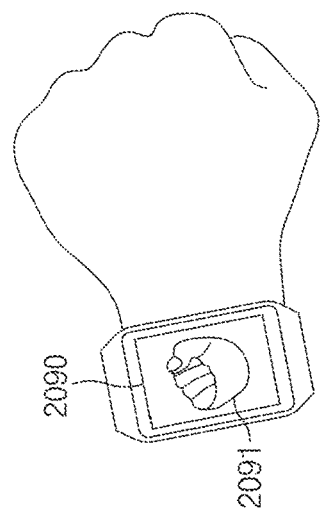

FIG. 20C is a view illustrating another screen that configures a lock screen differently depending on the type of an electronic device or the size of a display according to various embodiments of the present disclosure.

Referring to FIG. 20C, when the size of a display 2090 is limited such as a wearable device or a screen is not provided, the electronic device 2000 may configure and output a lock screen differently. According to an embodiment of the present disclosure, the electronic device 2000 may configure a lock screen to receive a lock release input based on a sensor. For example, the electronic device 2000 may configure a lock screen to allow a user to input setting information corresponding to a lock release input based on a sensor (for example, a muscle sensor) for sensing a user's finger unfolding degree. The drawing shown illustrates that the electronic device 2000 configures an image 2091 for inducing a user's finger to have a designated form (for example, a rock-paper-scissors form) as a lock screen and output it. Besides, the electronic device 2000 may configure an image for using user's biometric information or inducing a user to perform a designated operation (for example, raises an arm or rotates an arm). According to various embodiments of the present disclosure, the electronic device 2000 may output voice information for inducing a user to input setting information corresponding to a lock release input, instead of a lock screen.

According to various embodiments of the present disclosure, by utilizing various input/output devices or sensor modules included in the electronic device 20000, the electronic device 2000 may configure a lock screen in various forms and output it.

According to an embodiment of the present disclosure, setting information corresponding to a lock release input may vary according to a position where a lock object is disposed. For example, in a case that a screen is vertically divided into three equal parts and a position where a lock object is disposed is an upper end area, the electronic device 2000 may perform a control to additionally input a designated number (for example, the number 1) after an input of setting information corresponding to a lock release input and in a case that a position where a lock object is disposed is a lower end area, the electronic device 2000 may perform a control to additionally input a number (for example, the number 2) different from the designated number after an input of setting information corresponding to a lock release input.

According to various embodiments of the present disclosure, the electronic device 2000 may switch a display from a turn-off state into a turn-on state in correspondence to a designated condition. For example, the electronic device 2000 may turn on a display in correspondence to a case that an external electronic device registered with authenticated user information approaches, or a case that an authenticated user is detected based on a sensor, or a case that a user is detected based on a cloud system.

According to an embodiment of the present disclosure, when a wearable device (for example, a smart watch and so on) registered to the electronic device 2000 approaches within a predetermined distance, a display of the electronic device 2000 or a corresponding wearable device may be turned on automatically. In relation to this, the electronic device 2000 may receive user information from a corresponding approaching device and may determine whether a corresponding device is a registered electronic device based on corresponding information. According to an embodiment of the present disclosure, when it is determined that the corresponding device is a registered electronic device, the electronic device 2000 may not output a lock screen and release the lock.

According to various embodiments of the present disclosure, the electronic device 2000 may authenticate a user based on a sensor. For example, in the case of short distance, the electronic device 2000 may check a user's approach through a proximity sensor or an odor sensor, and in the case of long distance, check a user's approach by detecting a temperature change, a sound change (for example, a footstep) or a voice instruction (for example, "Hi, Galaxy") of a corresponding space. According to an embodiment of the present disclosure, a camera (for example, an infrared camera) and so on may operate directly in a corresponding device or operate within a short distance of a corresponding device, the electronic device 2000 may detect a user's approach and recognize it by delivering detected information to a device for controlling a display.

According to various embodiments of the present disclosure, the electronic device 2000 may track a user's movement in a limited space through a cloud system, for example, Internet of Things (IoT) Cloud. When a user is located in a designated space according to a corresponding movement, a control may be made to turn on the display of a device in a corresponding space.

As mentioned above, according to various embodiments of the present disclosure, an electronic device includes a touch screen display, a processor electrically connected to the display, and a memory electrically connected to the processor. The memory may store instructions that when executed, cause the processor to display a first screen comprising sets of objects to the display, configure, in response to a first touch input for selecting an object displayed on the first screen, at least one object included in a set of objects related to the selected object as at least on lock object for releasing a lock screen, and display a second screen configured with the at least one lock object.

According to various embodiments of the present disclosure, the instructions may cause the processor to remove another set of objects except for the set of objects from the first screen, instead of displaying the second screen.

According to various embodiments of the present disclosure, the instructions may cause the processor to additionally generate at least one object not displayed on the first screen in the set of objects, and configure the at least on generated object as the at least one lock object.

According to various embodiments of the present disclosure, the instructions may cause the processor to rearrange the at least one lock object based on a touch point of the first touch input.

According to various embodiments of the present disclosure, the instructions may cause the processor to change at least one of a position and size of an area where the at least one lock object is disposed based on at least one of a type of the electronic device, a size of the display, and usage setting information of the electronic device.

According to various embodiments of the present disclosure, the instructions may cause the processor to change at least one of the first screen and the second screen to a designated screen in response to a second touch input for selecting the at least one lock object.

According to various embodiments of the present disclosure, the instructions may cause the processor to differently configure the designated screen that is changed in response to the second touch input, according to the at least one selected lock object.

According to various embodiments of the present disclosure, the instructions may cause the processor, in a state that a first lock release pattern of the at least one lock object is configured as a lock release input for releasing the lock screen, to apply a second lock release pattern of the at least one lock object to the lock release input. The second lock release pattern may be configured to have the same or similar form and pattern input direction with the first lock release pattern but to have a different pattern input start position with the first lock release pattern.

According to various embodiments of the present disclosure, the instructions may cause the processor, in a state that a first lock release pattern of the at least one lock object is configured as a lock release input for releasing the lock screen, to apply a second lock release pattern of the at least one lock object to the lock release input. The second lock release pattern may be configured to have the same or similar form with the first lock release pattern but to have a different pattern input start position and pattern input direction with the first lock release pattern.

According to various embodiments of the present disclosure, an electronic device includes a touch screen display, a processor electrically connected to the display, and a memory electrically connected to the processor. The memory may store instructions that when executed, cause the processor to provide a state of receiving a touch input only through at least a part of a first screen, when the first screen is configured to be displayed on substantially entire area of the display, display at least one object on the first screen, generate, in response to a first touch input for selecting a designated area of the first screen or the at least one first object, at least one second object different from the at least one first object, configure the at least one second object as at least one lock object for releasing a lock screen, and display a second screen configured with at least one lock object.

According to various embodiments of the present disclosure, the instructions may cause the processor to generate the at least one second object using at least one image related to the at least one first object.

According to various embodiments of the present disclosure, the instructions may cause the processor to receive a second touch input for moving the at least one second object, determine whether the at least one second object is moved to correspond to a designated position of the first screen, and change at least one of the first screen and the second screen to a designated screen based on at least part of the determination.

According to various embodiments of the present disclosure, the instructions may cause the processor to differently configure the designated screen that is changed in response to the second touch input, according to the at least one second object or the designated position of the first screen.

According to various embodiments of the present disclosure, an electronic device includes a display for displaying a screen on at least one of a first area and a second area different from the first area, a processor electrically connected to the display, and a memory electrically connected to the processor. The memory may store instructions that when executed, cause the processor to display a first form of at least one lock object on the first area when at least one of the first area and the second area satisfies a first condition, and display a second form of the at least one lock object on the second area when at least one of the first area and the second area satisfies a second condition.

According to various embodiments of the present disclosure, the first condition may be that the first area is in an activated state and the second condition may be that the second area is in an activated state.

According to various embodiments of the present disclosure, the first condition may be that both the first area and the second area are in an activated state and the second condition may be that the first area is in a deactivated state and the second area is in an activated state.

According to various embodiments of the present disclosure, the first condition may be that the touch object is relatively closer to the first area than the second area and the second condition may be that the touch object is relatively closer to the second area that the first area.

According to various embodiments of the present disclosure, the first condition may be that the first area has a curvature of less than a designated size and the second condition may be that the second area has a relatively greater curvature than the first area.

According to various embodiments of the present disclosure, the first condition may be that the first area comprises a central area of the display and the second condition may be that the second area comprises at least one outline area of the display.

According to various embodiments of the present disclosure, the first form of the at least one lock object may be a pattern input object and the second form of the at least one lock object may be a password input object configured to correspond to the first form of the at least one lock object according to a designated order configured to release a lock screen.

As mentioned above, according to various embodiments of the present disclosure, a lock screen output controlling method may include displaying a first screen configured with at least one object at a time point of satisfying a designated condition by using the entire display substantially, receiving a touch input for selecting at least one point or the at least one object of the first screen, configuring at least one lock object on a second screen based on at least one of a position of at least one point on the first screen, the type of the at least one object, and a selection point of the at least one object, and outputting the second screen to the display.

Figure 21:
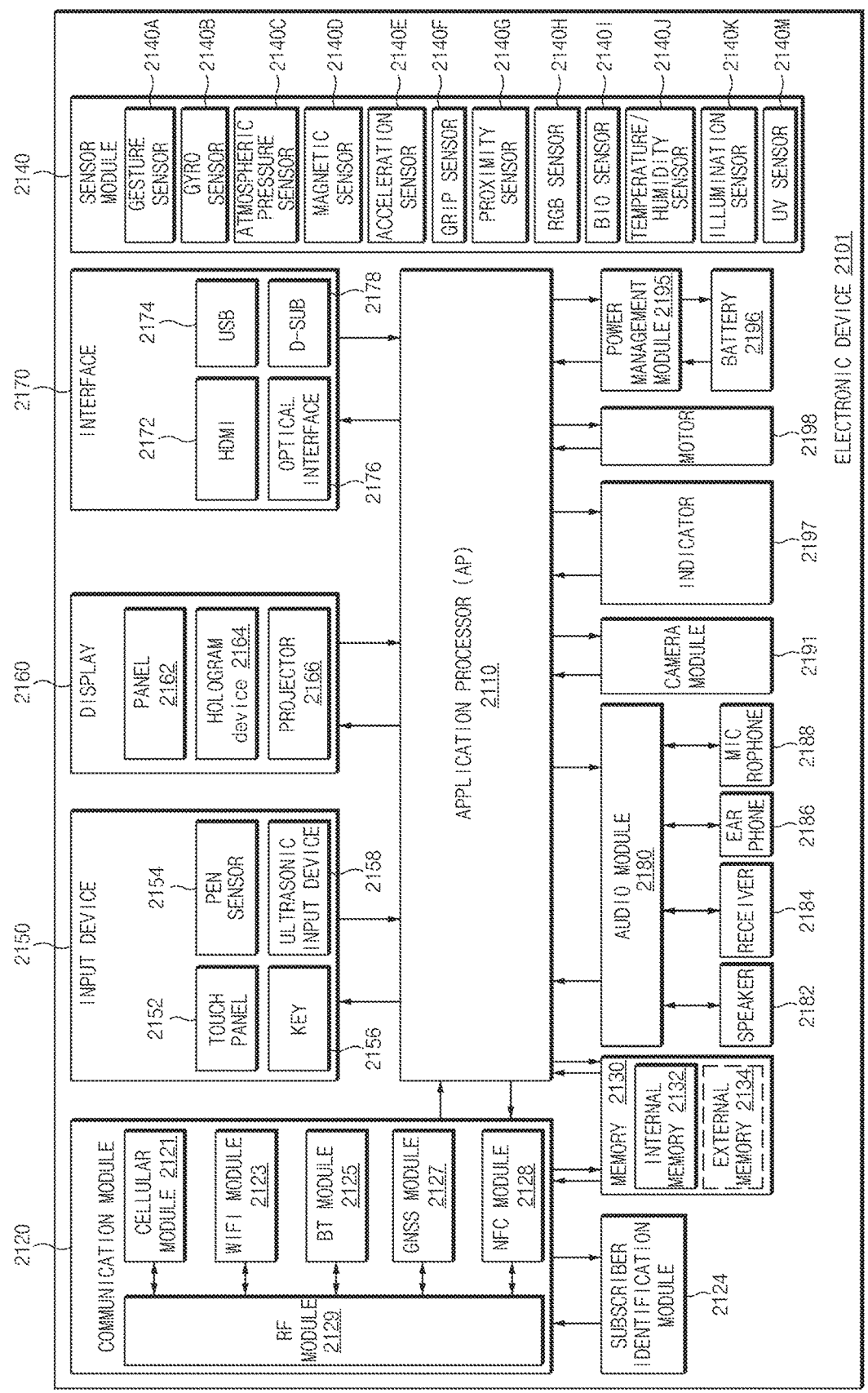
FIG. 21 is a block diagram of an electronic device according to various embodiments of the present disclosure.

FIG. 21 is a block diagram of an electronic device 2101 according to various embodiments of the present disclosure. The electronic device 2101, for example, may include all or part of the electronic device 101 shown in FIG. 1. The electronic device 2101 may include at least one processor (for example, an application processor (AP) 2110), a communication module 2120, a subscriber identification module (SIM) 2124, a memory 2130, a sensor module 2140, an input device 2150, a display 2160, an interface 2170, an audio module 2180, a camera module 2191, a power management module 2195, a battery 2196, an indicator 2197, and a motor 2198.

The processor 2110 may control a plurality of hardware or software components connected thereto and also may perform various data processing and operations by executing an OS or an application program. The processor 2110 may be implemented with a system on chip (SoC), for example. According to an embodiment of the present disclosure, the processor 2110 may further include a graphic processing unit (GPU) (not shown) and/or an image signal processor (ISP). The processor 2110 may include at least part (for example, the cellular module 2121) of components shown in FIG. 21. The processor 2110 may load commands or data received from at least one of other components (for example, nonvolatile memory) and process them and may store various data in a nonvolatile memory.

The communication module 2120 may have the same or similar configuration to the communication interface 170 of FIG. 1. The communication module 2120 may include a cellular module 2121, a Wi-Fi module 2123, a BT module 2125, a GNSS module 2127 (for example, a GPS module, a Glonass module, a Beidou module, or a Galileo module), an NFC module 2128, and a radio frequency (RF) module 2129.

The cellular module 2121, for example, may provide voice call, video call, text service, or internet service through communication network. According to an embodiment of the present disclosure, the cellular module 2121 may perform a distinction and authentication operation on the electronic device 2101 in a communication network by using a SIM (for example, the SIM card 2124). According to an embodiment of the present disclosure, the cellular module 2121 may perform at least part of a function that the processor 2110 provides. According to an embodiment of the present disclosure, the cellular module 2121 may include a communication processor (CP).

Each of the Wi-Fi module 2123, the BT module 2125, the GNSS module 2127, and the NFC module 2128 may include a processor for processing data transmitted/received through a corresponding module. According to an embodiment of the present disclosure, at least part (for example, at least one) of the cellular module 2121, the Wi-Fi module 2123, the BT module 2125, the GNSS module 2127, and the NFC module 2128 may be included in one integrated chip (IC) or IC package.

The RF module 2129, for example, may transmit/receive communication signals (for example, RF signals). The RF module 2129, for example, may include a transceiver, a power amp module (PAM), a frequency filter, a low noise amplifier (LNA), or an antenna. According to another embodiment of the present disclosure, at least one of the cellular module 2121, the Wi-Fi module 2123, the BT module 2125, the GNSS module 2127, and the NFC module 2128 may transmit/receive RF signals through a separate RF module.

The SIM 2124, for example, may include a card including a SIM and/or an embedded SIM and also may include unique identification information (for example, an integrated circuit card identifier (ICCID)) or subscriber information (for example, an international mobile subscriber identity (IMSI)).

The memory 2130 (for example, the memory 130) may include an internal memory 2132 or an external memory 2134. The internal memory 2132 may include at least one of a volatile memory (for example, dynamic random access memory (DRAM), static RAM (SRAM), synchronous dynamic RAM (SDRAM)) and a non-volatile memory (for example, one-time programmable ROM (OTPROM), programmable ROM (PROM), erasable and programmable ROM (EPROM), electrically erasable and programmable ROM (EEPROM), mask ROM, flash ROM, flash memory (for example, NAND flash or NOR flash), hard drive, and solid state drive (SSD)).

The external memory 2134 may further include flash drive, for example, compact flash (CF), secure digital (SD), micro-SD, mini-SD, extreme digital (xD), multi-media card (MMC) or a memory stick. The external memory 2134 may be functionally and/or physically connected to the electronic device 2101 through various interfaces.

The sensor module 2140 measures physical quantities or detects an operating state of the electronic device 2101, thereby converting the measured or detected information into electrical signals. The sensor module 2140 may include at least one of a gesture sensor 2140A, a gyro sensor 2140B, a barometric or atmospheric pressure sensor 2140B, a magnetic sensor 2140D, an acceleration sensor 2140E, a grip sensor 2140F, a proximity sensor 2140G, a color or RGB sensor 2140H (for example, a red, green, blue (RGB) sensor), a biometric sensor 2140I, a temperature/humidity sensor 2140J, an illumination sensor 2140K, and an ultra violet (UV) sensor 2140M. Additionally or alternatively, the sensor module 2140 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 2140 may further include a control circuit for controlling at least one sensor therein. According to an embodiment of the present disclosure, the electronic device 2101 may further include a processor configured to control the sensor module 2140 as part of or separately from the processor 2110 and thus may control the sensor module 2140 while the processor 2110 is in a sleep state.

The input device 2150 may include a touch panel 2152, a (digital) pen sensor 2154, a key 2156, or an ultrasonic input device 2158. The touch panel 2152 may use at least one of capacitive, resistive, infrared, or ultrasonic methods, for example. Additionally, the touch panel 2152 may further include a control circuit. The touch panel 2152 may further include a tactile layer to provide tactile response to a user.

The (digital) pen sensor 2154, for example, may include a sheet for recognition as part of a touch panel or a separate sheet for recognition. The key 2156 may include a physical button, an optical key, or a keypad, for example. The ultrasonic input device 2158 may detect ultrasonic waves generated from an input tool through a microphone (for example, the microphone 2188) in order to check data corresponding to the detected ultrasonic waves.

The display 2160 (for example, the display 160) may include a panel 2162, a hologram device 2164, or a projector 2166. The panel 2162 may have the same or similar configuration to the display 160 of FIG. 1. The panel 2162 may be implemented to be flexible, transparent, or wearable, for example. The panel 2162 and the touch panel 2152 may be configured with one module. The hologram 2164 may show three-dimensional images in the air by using the interference of light. The projector 2166 may display an image by projecting light on a screen. The screen, for example, may be placed inside or outside the electronic device 2101. According to an embodiment of the present disclosure, the display 2160 may further include a control circuit for controlling the panel 2162, the hologram device 2164, or the projector 2166.

The interface 2170 may include a high-definition multimedia interface (HDMI) 2172, a universal serial bus (USB) 2174, an optical interface 2176, or a D-subminiature (D-sub) 2178, for example. The interface 2170, for example, may be included in the communication interface 170 shown in FIG. 1. Additionally or alternatively, the interface 2170 may include a mobile high-definition link (MHL) interface, a secure digital (SD) card/multi-media card (MMC) interface, or an infrared data association (IrDA) standard interface.

The audio module 2180 may convert sound into electrical signals and convert electrical signals into sounds. At least some components of the audio module 2180, for example, may be included in the input/output interface 150 shown in FIG. 1. The audio module 2180 may process sound information inputted/outputted through a speaker 2182, a receiver 2184, an earphone 2186, or a microphone 2188.

The camera module 2191, as a device for capturing a still image and a video, may include at least one image sensor (for example, a front sensor or a rear sensor), a lens, an image signal processor (ISP), or a flash (for example, an LED or a xenon lamp).

The power management module 2195 may manage the power of the electronic device 2101. According to an embodiment of the present disclosure, the power management module 2195 may include a power management IC (PMIC), a charger IC, or a battery or fuel gauge, for example. The PMIC may have a wired and/or wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the battery 2196, or a voltage, current, or temperature thereof during charging. The battery 2196, for example, may include a rechargeable battery and/or a solar battery.

The indicator 2197 may display a specific state of the electronic device 2101 or part thereof (for example, the processor 2110), for example, a booting state, a message state, or a charging state. The motor 2198 may convert electrical signals into mechanical vibration and may generate vibration or haptic effect. Although not shown in the drawings, the electronic device 2101 may include a processing device (for example, a GPU) for mobile TV support. A processing device for mobile TV support may process media data according to the standards such as digital multimedia broadcasting (DMB), digital video broadcasting (DVB), or mediaFLO™.

Each of the above-mentioned components of the electronic device according to various embodiments of the present disclosure may be configured with at least one component and the name of a corresponding component may vary according to the kind of an electronic device.

According to various embodiments of the present disclosure, an electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

Figure 22:
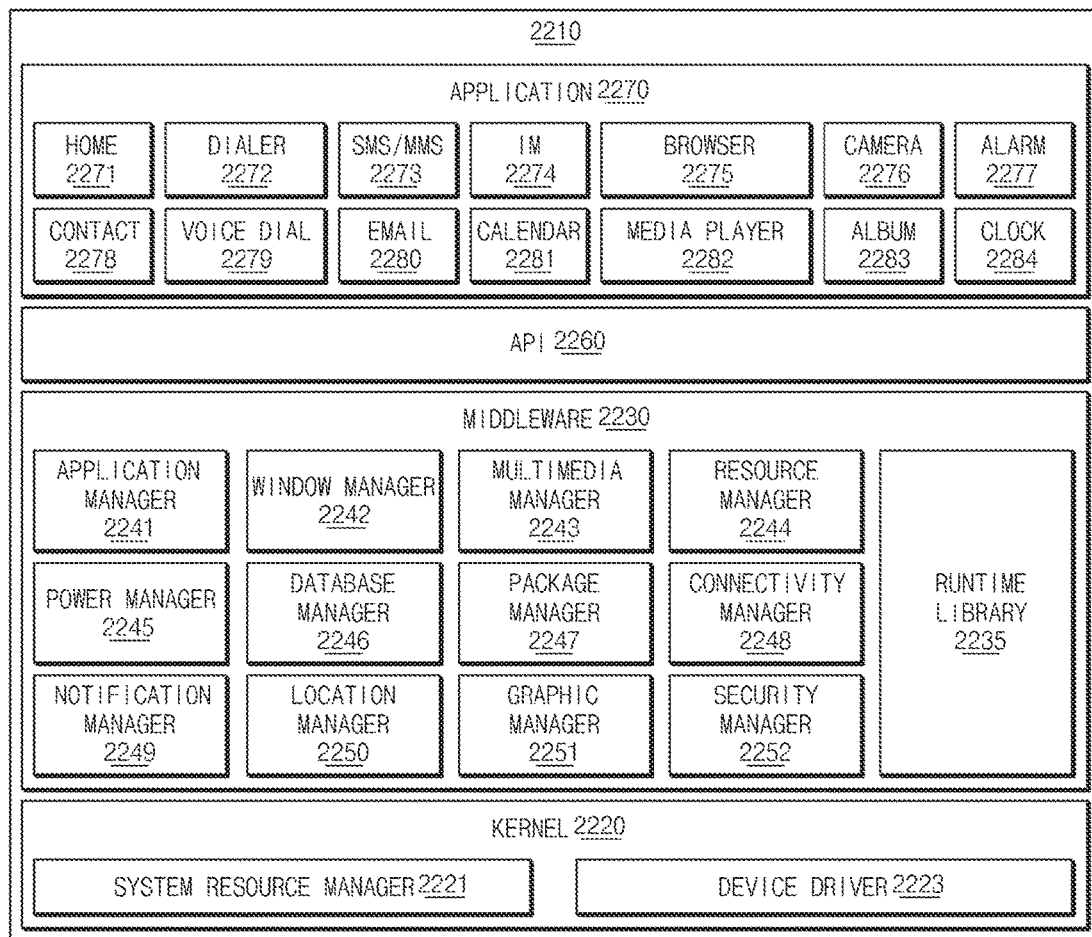
FIG. 22 is a block diagram of a program module according to various embodiments of the present disclosure.

FIG. 22 is a block diagram illustrating a program module according to various embodiments of the present disclosure. According to an embodiment, the program module 2210 (for example, the program 140) may include an operating system (OS) for controlling a resource relating to an electronic device (for example, the electronic device 101) and/or various applications (for example, the application program 147) running on the OS. The OS, for example, may include Android™, iOS™, Windows™, Symbian™, Tizen™, or Bada™.

The program module 2210 may include a kernel 2220, a middleware 2230, an application programming interface (API) 2260, and/or an application program (or an application) 2270. At least part of the program module 2210 may be preloaded on an electronic device or may be downloaded from a server (for example, the electronic devices 102 and 104 and the server 106).

The kernel 2220 (for example, including the kernel 141), for example, may include a system resource manager 2221 and/or a device driver 2223. The system resource manager 2221 may perform the control, allocation, or retrieval of a system resource. According to an embodiment of the disclosure, the system resource manager 2221 may include a process management unit, a memory management unit, or a file system management unit. The device driver 2223, for example, a display driver, a camera driver, a Bluetooth (BT) driver, a sharing memory driver, a USB driver, a keypad driver, a Wi-Fi driver, an audio driver, or an inter-process communication (IPC) driver.

The middleware 2230, for example, may provide a function that the application 2270 requires commonly, or may provide various functions to the application 2270 through the API 2060 in order to allow the application 2270 to efficiently use a limited system resource inside the electronic device. According to an embodiment, the middleware 2230 (for example, the middleware 143) may include at least one of a runtime library 2235, an application manager 2241, a window manager 2242, a multimedia manager 2243, a resource manager 2244, a power manager 2245, a database manager 2246, a package manager 2247, a connectivity manager 2248, a notification manager 2249, a location manager 2250, a graphic manager 2251, and a security manager 2252.

The runtime library 2235, for example, may include a library module that a compiler uses to add a new function through a programming language while the application 2270 is running. The runtime library 2235 may perform a function on input/output management, memory management, or an arithmetic function.

The application manager 2241, for example, may mange the life cycle of at least one application among the applications 2270. The window manager 2242 may manage a graphical user interface (GUI) resource used in a screen. The multimedia manager 2243 may recognize a format for playing various media files and may encode or decode a media file by using the codec corresponding to a corresponding format. The resource manager 2244 may manage a resource such as a source code, a memory, or a storage space of at least any one of the applications 2270.

The power manager 2245, for example, may operate together with a basic input/output system (BIOS) to manage the battery or power and may provide power information necessary for an operation of the electronic device. The database manager 2246 may create, search, or modify a database used in at least one application among the applications 2270. The package manager 2247 may manage the installation or update of an application distributed in a package file format.

The connectivity manger 2248 may manage a wireless connection such as Wi-Fi or BT. The notification manager 2249 may display or notify an event such as arrival messages, appointments, and proximity alerts to a user in a manner of not interrupting the user. The location manager 2250 may manage location information on an electronic device. The graphic manager 2251 may manage a graphic effect to be provided to a user or a user interface relating thereto. The security manager 2252 may provide various security functions necessary for system security or user authentication. According to an embodiment, when an electronic device (for example, the electronic device 101) includes a phone function, the middleware 2230 may further include a telephony manager for managing a voice or video call function of the electronic device.

The middleware 2230 may include a middleware module for forming a combination of various functions of the above-mentioned components. The middleware 2230 may provide a module specialized for each type of OS to provide differentiated functions. Additionally, the middleware 2230 may delete part of existing components or add new components dynamically.

The API 2260 (for example, the API 145), for example, as a set of API programming functions, may be provided as another configuration according to OS. For example, in the case of android or iOS, one API set may be provided for each platform and in the case Tizen, at least two API sets may be provided for each platform.

The application 2270 (for example, the application program 147) may include at least one application for providing functions such as a home 2271, a dialer 2272, an short message service (SMS)/multimedia messaging service (MMS) 2273, an instant message (IM) 2274, a browser 2275, a camera 2276, an alarm 2277, a contact 2278, a voice dial 2279, an e-mail 2280, a calendar 2281, a media player 2282, an album 2283, a clock 2284, health care (for example, measure an exercise amount or blood sugar), or environmental information provision (for example, provide air pressure, humidity, or temperature information).

According to an embodiment, the application 2270 may include an application (hereinafter referred to as "information exchange application") for supporting information exchange between the electronic device (for example, the electronic device 101) and an external electronic device (for example, the electronic device 102 or 104). The information exchange application, for example, may include a notification relay application for relaying specific information to the external device or a device management application for managing the external electronic device.

For example, the notification relay application may have a function for relaying to an external electronic device (for example, electronic devices 102 and 104) notification information occurring from another application (for example, an SMS/MMS application, an e-mail application, a health care application, or an environmental information application) of the electronic device. Additionally, the notification relay application may receive notification information from an external electronic device and may then provide the received notification information to a user.

The device management application, for example, may manage (for example, install, delete, or update) at least one function (turn-on/turn off of the external electronic device itself (or some components) or the brightness (or resolution)

adjustment of a display) of an external electronic device (for example, the electronic devices 102 and 104) communicating with the electronic device, an application operating in the external electronic device, or a service (for example, call service or message service) provided from the external device.

According to an embodiment of the disclosure, the application 2270 may include a designated application (for example, a health care application of a mobile medical device) according to the property of an external electronic device (for example, the electronic devices 102 and 104).

According to an embodiment, the application 2270 may include an application received from an external electronic device (for example, the server 106 or the electronic device 102 or 104). According to an embodiment of the disclosure, the application 2270 may include a preloaded application or a third party application downloadable from a server. The names of components in the program module 2210 according to the shown embodiment may vary depending on the type of OS.

According to various embodiments of the present disclosure, at least part of the program module 2210 may be implemented with software, firmware, hardware, or a combination thereof. At least part of the programming module 2210, for example, may be implemented (for example, executed) by a processor (for example, the processor 2110). At least part of the programming module 2210 may include a module, a program, a routine, sets of instructions, or a process to perform at least one function, for example.

According to various embodiments of the present disclosure, by outputting a first screen that includes a designated image or a designated image and a designated display object as a lock screen, designated information may be displayed through the entire area of the lock screen.

According to various embodiments of the present disclosure, by outputting a second screen configured with a lock object in correspondence to an input for selecting a designated point or object of the first screen or a biometric information input, a lock screen may be configured differently according to setting information such as a security level or a theme.

According to various embodiments of the present disclosure, by differently configuring a lock object according to the type of an electronic device or the size of a display included in an electronic device and outputting a lock screen, various forms of lock screens adaptively configured according to an electronic device may be provided.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the processor 120) executes an instruction, it may perform a function corresponding to the instruction. The non-transitory computer-readable storage media may include the memory 130, for example.

The non-transitory computer-readable storage media may include hard disks, floppy disks, magnetic media (for example, magnetic tape), optical media (for example, compact disc read only memory (CD-ROM), and digital versatile disc (DVD)), magneto-optical media (for example, floptical disk), and hardware devices (for example, read only memory (ROM), random access memory (RAM), or flash memory). Additionally, a program instruction may include high-level language code executable by a computer using an interpreter in addition to machine code created by a complier. The hardware device may be configured to operate as at least one software module to perform an operation of various embodiments of the present disclosure and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added. Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
a touch screen display;
a processor electrically connected to the display; and
a memory electrically connected to the processor,
wherein the memory stores instructions that, when executed, cause the processor to:
display a first screen comprising different sets of objects to the display, wherein each of the sets includes a plurality of objects,
configure, in response to a first touch input for selecting an object displayed on the first screen, a lock pattern including a set of checkpoints, wherein the set of checkpoints includes the selected object as a check point for receiving lock release input, and
display a second screen configured with the lock pattern.

2. The electronic device of claim 1, wherein the instructions cause the processor to remove another set of objects except for the set of checkpoints from the first screen, to display the second screen.

3. The electronic device of claim 1, wherein the instructions cause the processor to:

further display at least one object not displayed on the first screen in the set of checkpoints, and configure the at least one displayed object as the lock pattern.

4. The electronic device of claim 1, wherein the instructions cause the processor to rearrange the lock pattern based on a touch point of the first touch input.

5. The electronic device of claim 1,
wherein the instructions cause the processor to change at least one of:
a position and size of an area where the lock pattern is disposed based on at least one of a type of the electronic device,
a size of the display, and
usage setting information of the electronic device.

6. The electronic device of claim 1, wherein the instructions cause the processor to change the second screen to a designated screen according to a second touch input to the lock pattern.

7. The electronic device of claim 1, wherein the instructions cause the processor to release the lock pattern with a pattern input having the same pattern with a lock release pattern for releasing the lock pattern but having a different start checkpoint with the lock release pattern.

8. The electronic device of claim 1, wherein the instructions cause the processor to release the lock pattern with a pattern input having the same pattern with a lock release pattern for releasing the lock pattern but having a different start checkpoint and a different pattern input direction with the lock release pattern.

9. An electronic device comprising:
a display comprising a first display area and a second display area which is located in an edge area of the display;
a processor electrically connected to the display; and
a memory electrically connected to the processor,
wherein the memory stores instructions that, when executed, cause the processor to:
display a first lock pattern on the first display area when the first display area is turned on, and
display a second lock pattern which is different from the first lock pattern on the second display area when the second display area is turned on and the first display area is turned off.

10. The electronic device of claim 9, wherein the first lock pattern is displayed on the first display area when the first display area is turned on and the second display area is turned on.

11. The electronic device of claim 9,
wherein the first lock pattern is displayed on the first display area when a touch object is closer to the first display area than the second display area, and
wherein the second lock pattern is displayed on the second display area when the touch object is closer to the second display area than the first display area.

12. The electronic device of claim 9, wherein the second display area has a greater curvature than the first display area.

13. The electronic device of claim 9,
wherein the first display area is a central area of the display, and
wherein the second display area is at least one outline area of the display.

14. The electronic device of claim 9,
wherein the first lock pattern comprises a set of checkpoints for receiving a lock release pattern, and
wherein the second lock pattern comprises a password input object configured to correspond to the first lock pattern.

* * * * *